US012149637B2

(12) United States Patent
Haque et al.

(10) Patent No.: US 12,149,637 B2
(45) Date of Patent: *Nov. 19, 2024

(54) BLOCKCHAIN FOR THE CONNECTED HOME

(71) Applicant: Comcast Cable Communications, LLC, Philadelphia, PA (US)

(72) Inventors: Asad Haque, Chesterbrook, PA (US); Noopur Davis, Pittsburgh, PA (US); Sridhar Solur, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 688 days.

This patent is subject to a terminal disclaimer.

(21) Appl. No.: 16/254,817

(22) Filed: Jan. 23, 2019

(65) Prior Publication Data

US 2019/0229930 A1 Jul. 25, 2019

Related U.S. Application Data

(60) Provisional application No. 62/621,566, filed on Jan. 24, 2018.

(51) Int. Cl.
*H04L 29/06* (2006.01)
*H04L 9/32* (2006.01)
(Continued)

(52) U.S. Cl.
CPC .......... *H04L 9/3263* (2013.01); *H04L 9/3239* (2013.01); *H04L 9/3247* (2013.01);
(Continued)

(58) Field of Classification Search
CPC ... H04L 9/3263; H04L 9/3239; H04L 9/3247; H04L 9/0643; H04L 63/10; H04L 63/12
(Continued)

(56) References Cited

U.S. PATENT DOCUMENTS 7,930,755 B1 * 4/2011 Miller ................ G06F 21/88
726/26
8,856,941 B2 * 10/2014 Cha ................... G06F 21/57
726/26
(Continued)

FOREIGN PATENT DOCUMENTS

FR 2013-131867 A1 * 9/2013
WO 2017/107976 A1 6/2017

OTHER PUBLICATIONS

Azaria Asaph et al: "MedRec: Using Blockchain for Medical Data Access and Permission Management", 2016 2nd International Conference on Open and Big Data (OBD), IEEE, Aug. 22, 2016 (Aug. 22, 2016), pp. 25-30, XP032969608.

*Primary Examiner* — Longbit Chai
(74) *Attorney, Agent, or Firm* — BakerHostetler

(57) ABSTRACT

A request to access a destination device associated may be received from a user device. The request may comprise a digital certificate. The digital certificate may comprise a public key of the user device. A distributed ledger address of the user device may be determined by applying a deterministic function to the public key of the user device. A distributed ledger entry may be created on a distributed ledger. The distributed ledger entry may comprise the address of the user device. Based on the distributed ledger entry, access to the destination device may be granted to the user device.

20 Claims, 12 Drawing Sheets

(51) Int. Cl.
*H04L 9/40* (2022.01)
*H04L 67/12* (2022.01)
*H04L 9/00* (2022.01)
*H04L 9/06* (2006.01)

(52) U.S. Cl.
CPC ............ *H04L 63/10* (2013.01); *H04L 63/12* (2013.01); *H04L 67/12* (2013.01); *H04L 9/0643* (2013.01); *H04L 9/50* (2022.05); *H04L 2209/76* (2013.01); *H04L 2209/805* (2013.01)

(58) Field of Classification Search
USPC ........................................................ 713/156
See application file for complete search history.

(56) References Cited

U.S. PATENT DOCUMENTS

| | | | |
|---|---|---|---|
| 9,858,781 B1 | 1/2018 | Campero et al. | |
| 10,033,731 B2* | 7/2018 | Steeves | G06F 21/31 |
| 10,708,070 B2* | 7/2020 | Fallah | H04L 9/3239 |
| 2009/0222517 A1* | 9/2009 | Kalofonos | H04L 67/1046 |
| | | | 709/204 |
| 2017/0366348 A1* | 12/2017 | Weimer | H04L 9/3236 |
| 2019/0020661 A1* | 1/2019 | Zhang | H04L 9/3242 |
| 2019/0349426 A1* | 11/2019 | Smith | H04L 67/104 |

* cited by examiner

BLOCKCHAIN FOR THE CONNECTED HOME

BACKGROUND

Network devices, such as Internet of Things (IoT) devices, may comprise embedded electronics, software, or network connectivity components. An IoT device may require authorization from an authority to communicate with another IoT device or to access another IoT device. The authority may determine whether two or more devices are associated, for example, by querying a resource such as a database that stores device association data. However, maintaining such a resource may be costly, and scaling may be difficult, as additional devices or associations are added to the device association data. Moreover, device association data may be misaligned, for example, during transfer or storage.

SUMMARY

A computing device may receive a request to access a destination device from a user device. The computing device may have authority to grant access to the destination device. The request may comprise a digital certificate associated with the user device. Based on the digital certificate, the computing device may determine an address of the user device. The computing device may determine to grant the user device access to the destination device. The computing device may cause a distributed ledger entry to be created on a distributed ledger. The distributed ledger entry may comprise an address of the destination device, the address of the user device, and/or a digital signature of the computing device. The distributed ledger entry may comprise an indication that the user device is authorized to access the destination device. The computing device may send, to the user device, information configured to enable the user device to communicate with the destination device, such as a public key of the destination device and/or a locator of the destination device on a network to the user device.

The destination device may receive an access request from the user device. The request may comprise the public key of the user device. The destination device may determine the address of the user device by applying a deterministic function to the public key. The destination device may access the distributed ledger entry comprising the address of the user device. The destination device may grant, based on the distributed ledger entry, the user device access to a function of the destination device.

BRIEF DESCRIPTION OF THE DRAWINGS

The following drawings show generally, by way of example, but not by way of limitation, various examples discussed in the present disclosure. In the drawings.

DETAILED DESCRIPTION

A device, such as a network device, an IoT device, and/or a user device, may be configured to communicate with other devices. A first device may require authorization from another device to communicate with a second device or to access the second device. The authority device may determine whether the devices are associated. The authority device may determine to grant the first device access to the second device. The authority device may generate a distributed ledger entry. The distributed ledger entry may comprise an address of the first device, an address of the second device, and/or a digital signature of the authority device. The authority device may send a public key of the second device and a locator of the second device on a network to the first device. The first device may communicate with the second device using the public key and the locator.

Figure 1:
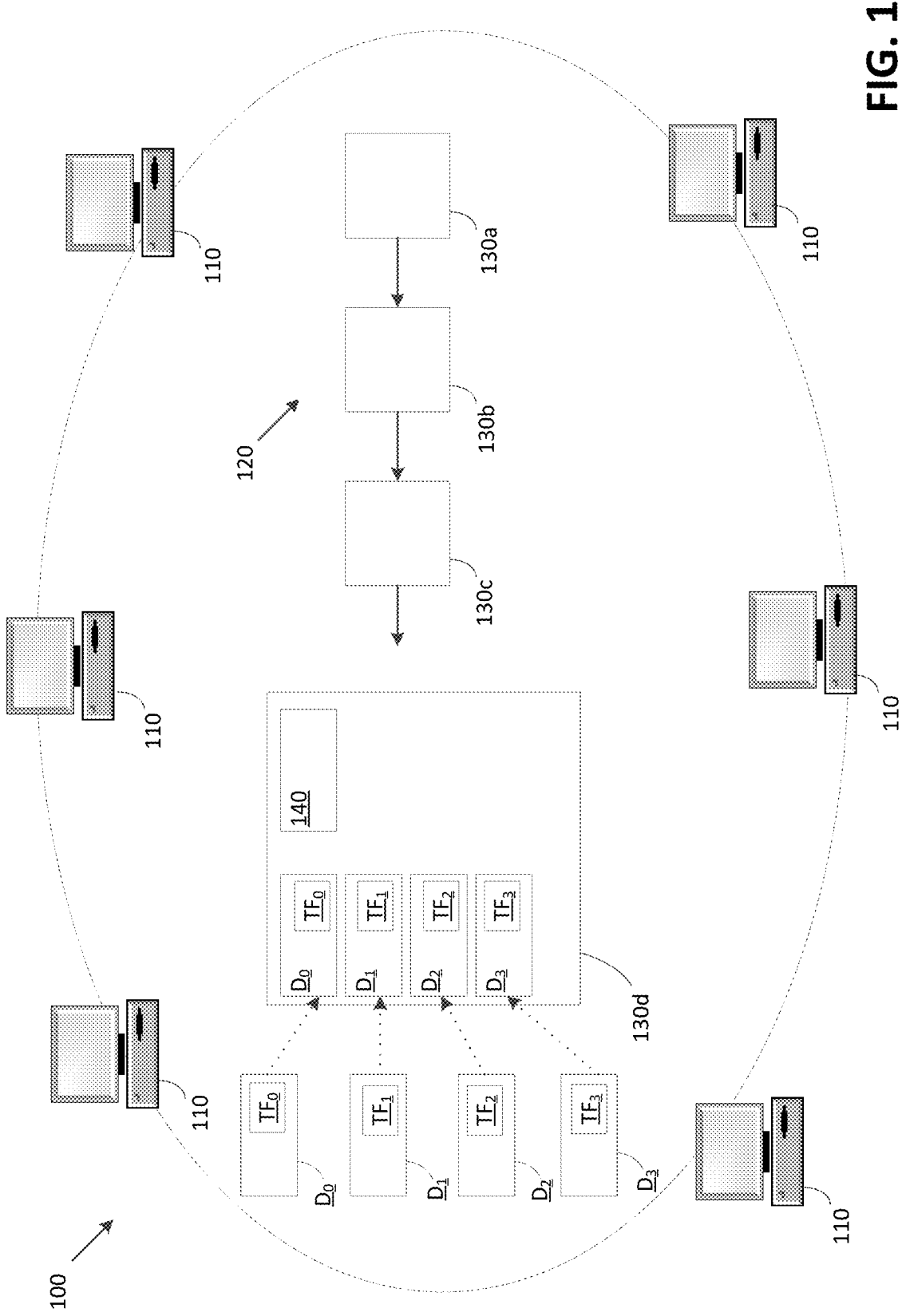
FIG. 1 shows an example distributed system architecture.

FIG. 1 shows an example distributed system. The distributed system may comprise a network 100 of nodes 110. A node 110 may comprise, for example, a computing device, a central processing unit, a graphical processing unit, a field programmable gate array, or an application specific integrated circuit. A node 110 may comprise an Internet of Things ("IoT") device, such as a device with computing capabilities or network connectivity capabilities.

The network 100 of nodes 110 may comprise a decentralized database. The decentralized database may not have a central administrator or centralized storage. For example, each node 110 in the network 100 may store a copy of a collection of data, such as a distributed ledger (e.g., distributed database, decentralized database, blockchain, etc.). A distributed ledger may comprise recorded entries, such as transactions. The entries may comprise parties to the transactions. The parties may comprise individuals, entities, or devices, for example. The data may be replicated, shared, or synchronized across the nodes 110. The decentralized database may be continually reconciled, such as to reflect changes to the collection of data. The nodes 110 may continually or periodically download the most recent version of the collection of data. The node 110 may automatically download the collection of data. The node 110 may download the collection of data based on a node 110 joining the network 100, A decentralized ledger (e.g., distributed database, decentralized database, blockchain, etc.), may comprise a blockchain-type database 120 that utilizes, in whole or in part, blockchain-type data management techniques. A blockchain 120 may comprise one or more blocks 130 in which data is recorded. The blocks 130 in the blockchain 120 may function as a mechanism to organize the data in the chain 120. For example, the blocks 130 may be linked in a sequence determined by a relationship of the data in the blocks 130, such as the chronology in which the data is recorded or validated. The blocks 130 may be linked to deter retroactive modification of data in the chain 120.

The nodes 110 in the network 100 may build or modify the chain 120, such as by adding blocks 130 to the chain 120.

The nodes 110 may perform several operations to build the chain 120. For example, based on the network 100 receiving new data $D_0, D_1, D_2, D_3$, the nodes 110 may validate the new data $D_0, D_1, D_2, D_3$. For example, if the new data $D_0, D_1, D_2, D_3$ comprises data such as transactions or access rights, the nodes 110 may authenticate the identity of the parties to the transaction or recipients of the access rights. Authenticating the identity of one or more of the parties may comprise determining that a party is who they purport to be. For example, a party may identify themselves by signing the transaction or the entry with a digital signature. The digital signature may comprise an encryption of at least a portion of the contents of the entry with a private key of the party. The private key may comprise a string of numbers. The private key may only be known to the party, accessible to the party, or possessed by the party. The entry may comprise a public key of the party. The public key may comprise a string of number. The public key may be used to decrypt data that has been encrypted with the private key. The nodes 110 may confirm that the party is associated with the public key by confirming that the party has the private key corresponding to the public key. The nodes 110 may confirm that the party has the private key by decrypting the portion of the transaction that was encrypted using the private key, such as using the public key.

The nodes 110 may collate the new data $D_0, D_1, D_2, D_3$ into a new block 130d. The nodes may record one data entry $D_0$ in a new block 130d. The nodes 110 may perform an operation to add the new block 130d to the chain 120. For example, if the data in the blocks 130 is related chronologically, such as where the first block 130a in the chain records older data than the data of subsequent blocks 130b, 130c, the nodes 110 may perform a timestamp function to log the sequence in which blocks 130 are added to and/or created on the chain 120. The nodes 110 may append a hash of the previous block 130c to the new bock 130d. The nodes 110 may insert an output of the previous block 130 in an input of the new block 130d. The chaining of the blocks, such as through iterative functions, may deter retroactive modification of data in a block 130 as the modification would require new functions to be performed for all of the subsequent blocks 130 in the chain 120.

The nodes 110 may be incentivized to perform the operation to add a new block 130d to the chain 120. For example, a block 130d may be assigned a value 140, such as a coin or unit of digital currency that will be transferred to one or more nodes 110 that perform part of all of the operation. A digital currency may comprise a cryptocurrency, such as Bitcoin, Litecoin, or TorCoin. The value 140 may depend on the difficulty of performing the operation for the block 130d. Also, if the data $D_0, D_1, D_2, D_3$ recorded in a block 130d comprises transactions, a transaction may assign a transaction fee $TF_0, TF_1, TF_2, TF_3$ which may be transferred to one or more nodes 110 that perform the operation on the block 130d in which the transaction is recorded. If an incentive is provided for nodes 110 to perform the operation to add the new block 130d to the chain 120, performance of the operation may be referred to as mining.

The nodes 110 may individually perform an operation to build the chain 120. The nodes 110 may lend or combine their processing power, such as in a pool, to perform an operation to build the chain 120. If the nodes 110 work in tandem, incentives, such as the value 140, may be divided amongst the nodes 110. For example, incentives may be divided proportionally to contribution of the nodes 110 to the work.

Once the operation is performed to add a new block 130d to the chain 120, the nodes 110 may communicate the new block 130d to the network 100. The nodes 110 may express their acceptance of the new block 130d to the chain 120 by working off the block 130d when performing the operation to add a subsequent block to the chain 120. If more than one version of the chain 120 exists, the nodes 110 may attempt to work off the longest chain 120. The longest chain 120 may be determined by an algorithm for scoring the chain 120. For example, a chain 120 may be assigned a score based on the computational work required to create the chain 120. A node 110 may communicate the longest chain 120 that the node 100 has observed to the network 100, such as with a gossip protocol.

The network 100 may have self-correcting mechanisms, such as to address discrepancies between nodes 110 in the network 100. For example, if there is a fork in a blockchain 120, a node 110 working off one branch of the chain 120 may switch to a second branch of the chain 120 if the second branch becomes longer than the first branch. For example, if a node 110 does not receive a block 130, the node 110 may request the block 130 based on receiving the next block 130 and determining that it did not receive the previous block 130.

One or more nodes 110 in the network 100 may not participate in building the blockchain 120. The operations that the nodes 110 in the network 100 may perform relating to the blockchain may not be limited to building the blockchain 120. For example, one or more nodes 110 may monitor the blockchain 120 for particular transactions. For example, the nodes 110 may monitor the blockchain 120 for transactions that comprise an identifier associated with a party.

Figure 2:
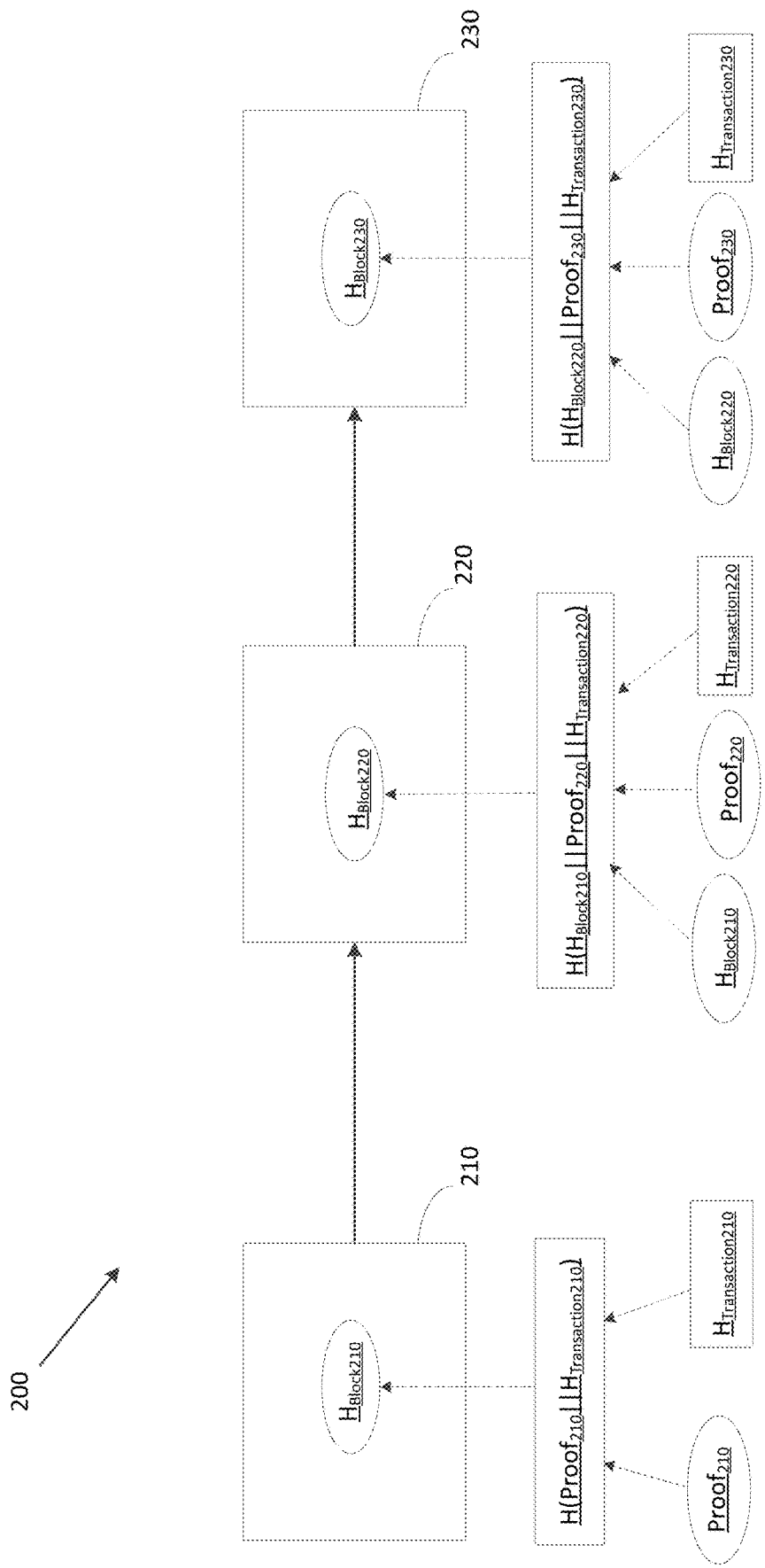
FIG. 2 shows an example blockchain architecture.

FIG. 2 shows an example distributed ledger architecture. A distributed ledger (e.g., a distributed database, decentralized database) may comprise a blockchain 200 in which one or more transactions are recorded in blocks 210, 220, 230. The blocks 210, 220, 230 may be linked in a sequence that represents the chronology of the execution, validation, or recording of the transactions. For example, the blockchain 200 may comprise a genesis block 210 that records the earliest transaction in the chain 200 and comprises the first block 210 in the chain 200. Each block 220, 230 following the genesis block 210 may record a transaction that was executed or validated subsequent to the transaction of the preceding block 210, 220, 230 in the chain 200. Each block 210, 220, 230 may record a transaction that occurred prior to the transaction of the subsequent block in the chain 220, 230. For example, the block 230 may record a transaction that occurred after the transaction recorded in the block 220. A new transaction may be recorded in a new block. The new block may be appended to the last block 230 in the chain 200. Although the example blockchain 200 is depicted as comprising three blocks 210, 220, 230, the chain may comprise less than three blocks or more than three blocks. The blocks 210, 220, 230 may record transactions as hashes of the transactions.

The blocks 210, 220, 230 may function as a mechanism to implement a timestamp server to generate computational proof of the chronological order of the transactions in the blockchain 200. A timestamp of a block 210, 220, 230 may comprise a hash of the transaction in the block 210, 220, 230 and the transaction of the previous block 210, 220, 230 in the chain 200. The timestamp may be recorded, such as by recording and publishing. To eliminate the requirement to publish the timestamp, a distributed timestamp server may implement a protocol to achieve distributed chronological consensus, such as a proof protocol. A proof protocol may comprise a proof-of-work protocol, a proof-of-stake protocol, a proof-of-existence protocol, or another proof protocol.

A proof-of-work protocol may comprise scanning for a proof ($Proof_{210}$, $Proof_{220}$, $Proof_{230}$), such as a string or value, that cryptographically hashed with the hash of the transaction of a block ($H_{Transaction}$) and the hash of the transaction of the previous block 210, 220, 230 yields a hash ($H_{Block}$) with a pre-determined number of leading zero bits. For example, a proof ($Proof_{210}$, $Proof_{220}$, $Proof_{230}$) may be identified such that the hash ($H_{Block}$) has 60 leading bits that are zero.

For example, a proof-of-work for the block 220 may comprise scanning for a proof ($Proof_{220}$) that hashed with the transaction $T_0$, $T_1$, $T_2$, $T_3$ of the block 220 and the hash $H_{Block210}$ of the previous block 210 yields an output $H_{Block120}$ that has a pre-determined number of leading zero bits. The proof-of-work may be solved for a hash function in which a hash of the transaction ($H_{Transaction}$) is an input of the hash function. The next block 230 in the chain 200 will be appended to the chain 200 based on a proof-of-work being performed to identify a proof ($Proof_{230}$) which hashed with the transaction of the block 230 (or hash of the transaction $H_{Transaction230}$) and the hash of the block 220 ($H_{Block220}$) yields an output ($H_{Block230}$) with a pre-determined number of leading zero bits. Once the proof ($Proof_{230}$) is identified, the block 230 may be broadcast through the network. If the block 230 is accepted, the nodes may work on creating the next block in the chain 200 using the hash ($H_{Block230}$) of the accepted block 230.

An iterative proof-of-work protocol may deter modification of a block in the chain as it would require re-doing the proof-of-work for each proceeding block in the chain 200. For example, modification of a transaction in the block 210 may require performance of a new proof-of-work for block 210, yielding a new hash ($H_{Block210}$) for the block 210. Consequently, a new proof-of-work may be required for the block 220 using the new hash ($H_{Block210}$) for the block 210, yielding a new hash ($H_{Block220}$) for the block 220. Each subsequent block in the chain 200 may require a new proof-of-work.

Figure 3:
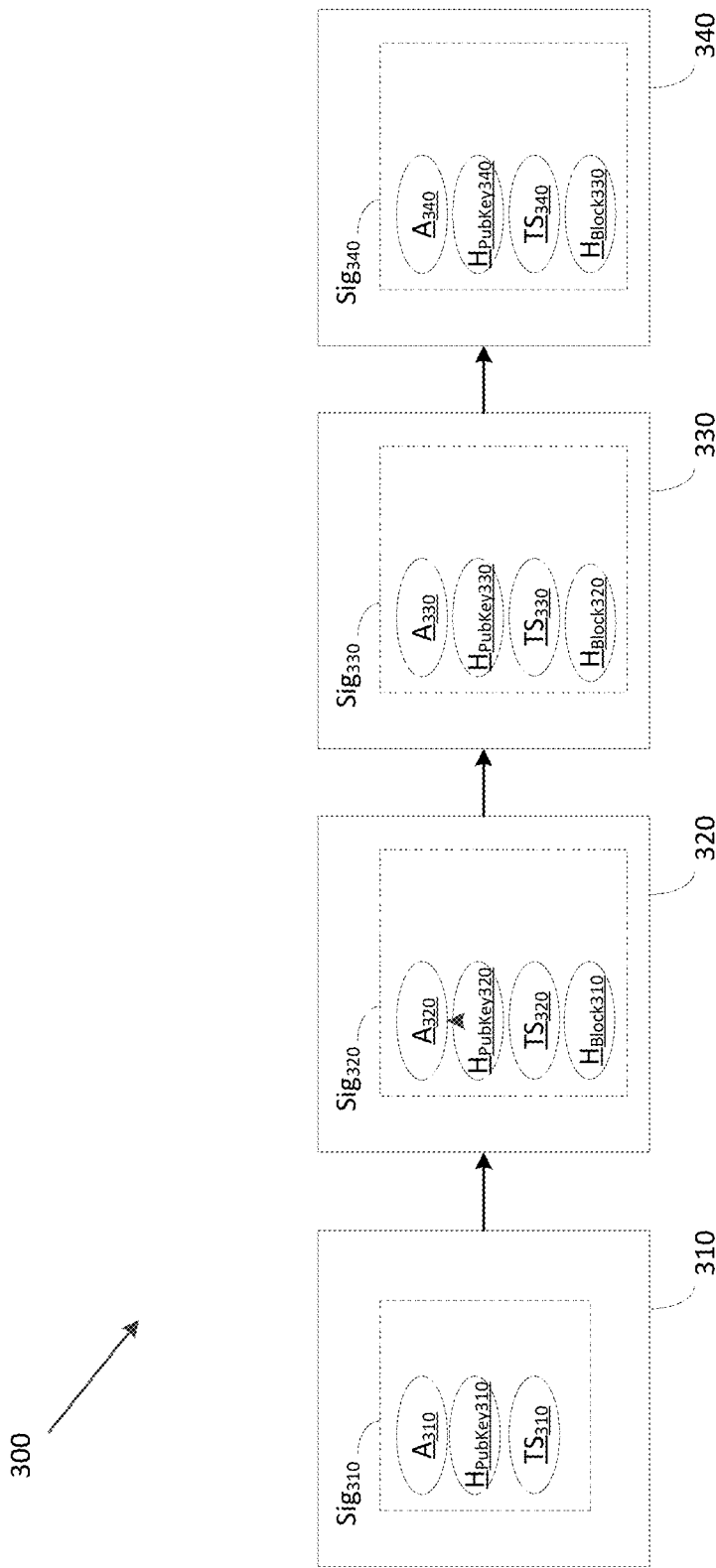
FIG. 3 shows an example distributed ledger architecture.

FIG. 3 shows an example system for managing device association. The system may comprise a distributed ledger 300 (e.g., distributed database, decentralized database, blockchain, etc.). The distributed ledger may comprise blockchain data managing techniques. The distributed ledger 300 may comprise a register of devices. The distributed ledger 300 may comprise a register of associated devices. Associated devices may comprise devices associated with a common entity such as a user, a household, or a service provider for example. The devices may comprise computing devices, electronic devices, or Internet of Things (IoT) devices. An IoT device may comprise a device embedded with electronics, such as a circuitry part, a sensor, a camera, an audio input or output, or a lighting unit. An IoT device may comprise computing capabilities. An IoT device may comprise network connectivity capabilities. An IoT device may comprise capabilities to collect and exchange data. For example, an IoT device may comprise a personal computer, a mobile phone, a household appliance, a wearable, a gateway device, a health appliance, a premises management system component, a content device, a display, and a vehicle.

The distributed ledger 300 may be associated with an entity, such as a user, a household, or a service provider. The uniqueness of the distributed ledger 300 to the entity may disincentivize targeting of the distributed ledger 300, such as for tampering or breaching. Comprising device data associated with the entity, the distributed ledger 300 may not comprise a honeypot of data for an authorized user to access. For example, a party attempting to tamper with a database to acquire private data, such as credit card information, may at best only obtain the credit card information of the entity from the distributed ledger 300.

The distributed ledger 300 may be anonymous. For example, the distributed ledger 300 may not comprise data identifying the associated entity, such as a name, identification number, or account number of the associated entity. The distributed ledger 300 may not comprise unsecured data identifying the associated entity. The distributed ledger 300 may comprise data identifying the associated entity in a secure or encrypted form. The data identifying the associated entity in the secure form may be opaque to users or devices examining the distributed ledger 300. The distributed ledger 300 may not require a user to divulge ownership information, such as to a central authority or backend authentication system. The distributed ledger 300 may achieve security through obscurity. For example, the anonymity of the distributed ledger 300 may deter unauthorized tampering with the distributed ledger 300. A party wishing to access a device or data of the entity may not be able to identify the distributed ledger 300 as being associated with the entity.

The distributed ledger 300 may comprise a plurality of blocks 310, 320, 330, 340. Each block 310, 320, 330 may comprise a distributed ledger entry. The distributed ledger entry may comprise data associated with one or more devices, such as data identifying the devices. For example, each of the blocks 310, 320, 330 may comprise a public key of a device. The block 310, 320, 330 may comprise an address $A_{310}$, $A_{320}$, $A_{330}$ of the device. The address may the output of a deterministic function applied to the public key of the device. The deterministic function may comprise an algorithm which, for a given input, provides the same output. As an illustrative example, for a given key (e.g., public key), various device may implement the deterministic algorithm such that each of the various devices can calculate the same output, which may be used as an identifier or address.

The block 310, 320, 330 may comprise a timestamp $TS_{310}$, $TS_{320}$, $TS_{330}$, $TS_{340}$. The timestamp $TS_{310}$, $TS_{320}$, $TS_{330}$, $TS_{340}$ may indicate when the block 310, 320, 330 was created. The inclusion of the timestamps $TS_{310}$, $TS_{320}$, $TS_{330}$, $TS_{340}$ may link the blocks 310, 320, 330, 340. The block 310, 320, 330 may comprise a hash $H_{Block310}$, $H_{Block320}$, $H_{Block330}$ of the previous block 310, 320, 330 in the distributed ledger 300. The inclusion of the hash $H_{Block310}$, $H_{Block320}$, $H_{Block330}$ of the previous block 310, 320, 330 in the distributed ledger 300 may link the blocks 310, 320, 330. The inclusion of the hash $H_{Block310}$, $H_{Block320}$, $H_{Block330}$ of the previous block 310, 320, 330 in the distributed ledger 300 may comprise an iterative chain of hash functions. The linking of the blocks 310, 320, 330, 340 may deter unauthorized tampering or breaching of the distributed ledger 300. For example, tampering with a block 310, such as retroactively modifying the block 310, may require modification of the subsequent blocks 320, 330, 340. The computing power or labor to tamper or breach the distributed ledger 300 may deter targeting of the distributed ledger 300 by an unauthorized entity.

The block 310, 320, 330 may comprise a signature $Sig_{310}$, $Sig_{320}$, $Sig_{330}$, $Sig_{340}$. The signature $Sig_{310}$, $Sig_{320}$, $Sig_{330}$, $Sig_{340}$ may comprise an encryption of at least a portion of the block, such as the address $A_{310}$, $A_{320}$, $A_{330}$ or the timestamp $TS_{310}$, $TS_{320}$, $TS_{330}$, $TS_{340}$. The digital signature may comprise an encryption of the portion of the block with a private key of a device or an entity, such as an administrator of the distributed ledger 300. The signature $Sig_{310}$, $Sig_{320}$, $Sig_{330}$, $Sig_{340}$ may deter unauthorized tampering with the distributed ledger 300. The private key used to sign may be necessary to create or retroactively modify a block or entry of the distributed ledger 300. Only the device or entity with the private key may alter or add to the distributed ledger 300. The device or the entity may comprise an administrator of the distributed ledger 300.

The distributed ledger 300 may comprise a genesis block 310. The genesis block 310 may comprise the first block of the distributed ledger 300. The genesis block 310 may comprise the oldest block or the first block created of the distributed ledger 300. The genesis block 310 may be associated with a device, such as a computing device. The genesis block 310 may comprise data identifying the computing device. The computing device may be associated with an entity, such as a user, a household, or a service provider. The computing device may create the genesis block 310. The computing device may create the distributed ledger entry of the genesis block 310. The computing device may send the distributed ledger entry to the distributed ledger 300 or to a network. The computing device may record the distributed ledger entry in the genesis block 310. The computing device may create the distributed ledger 300. The computing device may create the subsequent blocks 320, 330, 340 of the distributed ledger 300. The computing device may create the distributed ledger entries of the subsequent blocks 320, 330, 340. The computing device may send the distributed ledger entries of the subsequent blocks 320, 330, 340 to the distributed ledger 300 or to a network.

The genesis block 310 may be associated with an application. The application may comprise a software program. The application may comprise a computing device application or a mobile device application, such as a premises security application for mobile devices. The application may be associated with an entity, such as a user, a household, or a service provider. The application may create the genesis block 310. The application may create the distributed ledger entry of the genesis block 310. The application may create the distributed ledger entry of the genesis block 310 or the genesis block 310 upon activation of the application. Activation of the application may comprise running the application, opening the application, or downloading the application. The application may send the distributed ledger entry of the genesis block 310 to the distributed ledger 300 or to a network. The application may record the distributed ledger entry in the genesis block 310. The application may create the distributed ledger 300. The application may create the subsequent blocks 320, 330, 340 of the distributed ledger 300. The application may create the distributed ledger entries of the subsequent blocks 320, 330, 340. The application may send the distributed ledger entries of the subsequent blocks 320, 330, 340 to the distributed ledger 300 or to a network.

The distributed ledger 300 may comprise a component of a distributed ledger. The distributed ledger 300 may comprise a branch of another blockchain, such as a general blockchain. The general blockchain may comprise a plurality of branches. Each of the plurality of branches may comprise a blockchain or another plurality of blockchains. The general blockchain may comprise a plurality of blockchains. Each of the plurality of blockchains may comprise a register of associated devices. Each of the plurality of blockchains may be associated with a common entity, such as a user, a household, or a service provider. The general blockchain may comprise a register of devices associated with an entity and each of the plurality of blockchains may comprise a register of devices associated with a sub-entity of the entity. As an illustrative example, the general blockchain may be associated with a company. Each of the plurality of blockchains may comprise a register of devices associated with a department of the company. As another illustrative example, the general blockchain may be associated with a household. Each of the plurality of blockchains may comprise a register of devices associated with a member of the household.

The distributed ledger 300 may be stored at a distributed network. The distributed ledger 300 may be stored across nodes, such as the nodes 110 of FIG. 1, in a distributed network, such as the network 100 of FIG. 1. The nodes may comprise computing devices. The nodes may comprise associated devices. For example, the nodes may comprise devices associated with the blocks 310, 320, 330 of the distributed ledger 300. The nodes may comprise devices identified by the data in the blocks 310, 320, 330, 340 of the distributed ledger 300.

The distributed ledger 300 may be updated. Updating the distributed ledger 300 may comprise creating a distributed ledger entry. Updating the distributed ledger 300 may comprise sending a distributed ledger entry to the distributed ledger 300 or a network. Updating the blockchain may comprise recording the distributed ledger entry in a block 310, 320, 330, 340 of the distributed ledger 300. Updating the blockchain may comprise creating a block 310, 320, 330, 340 of the distributed ledger 300.

The distributed ledger 300 may be updated by a computing device or an application. The distributed ledger 300 may be updated by a computing device associated with the distributed ledger 300, such as a computing device identified by data in a block 310, 320, 330, 340 of the distributed ledger 300. The blockchain may be updated by a computing device associated with an entity associated with the blockchain. The distributed ledger 300 may be updated by a device comprising software to access the distributed ledger 300.

The software may comprise an application or custom software. The software may comprise a custom software library. The software may comprise software configured to enable a device to create a distributed ledger entry. The software may comprise software configured to enable a device to submit the distributed ledger entry to the distributed ledger or to a network of nodes associated with the distributed ledger. The software may be configured to enable a device to compute a distributed ledger address of another device based on a public key of the other device. The software may be configured to enable a device to authenticate an entry, such as a block, of the distributed ledger. The software may be configured to enable a device to validate an entry, such as a block. For example, using the software, the device may validate that the entry is signed by another associated device.

The distributed ledger 300 may be updated by a user. Alternatively or additionally, the distributed ledger 300 or a system may be configured such that a user has limited access to the distributed ledger 300. For example, the distributed ledger 300 or the system may be configured such that a user may not update the distributed ledger 300 or may not directly update the distributed ledger 300.

Updating the distributed ledger 300 may comprise creating a distributed ledger entry, such as using the custom software library. Updating the distributed ledger 300 may comprise sending the distributed ledger entry to the distributed ledger 300 or a network. Updating the distributed ledger 300 may comprise recording the distributed ledger entry in a new block of the distributed ledger 300. Updating the distributed ledger 300 may comprise creating a new block. Updating the distributed ledger 300 may comprise sending a new block to the distributed ledger 300 or a network. Updating the distributed ledger 300 may comprise performing underlying blockchain integration, such as validating a new block or performing a proof to add a new block to the blockchain.

Updating the blockchain may comprise using custom software. The software may comprise a custom software library. The software may comprise software configured to enable a device to create a distributed ledger entry. The software may comprise software configured to enable a device to submit the distributed ledger entry to the distributed ledger or to a network of nodes associated with the distributed ledger. The software may be configured to enable a device to compute a distributed ledger address of another device based on a public key of the other device. The software may be configured to enable a device to authenticate an entry, such as a block, of the distributed ledger. The software may be configured to enable a device to validate an entry, such as a block. For example, using the software, the device may validate that the entry is signed by another associated device.

Figure 4:
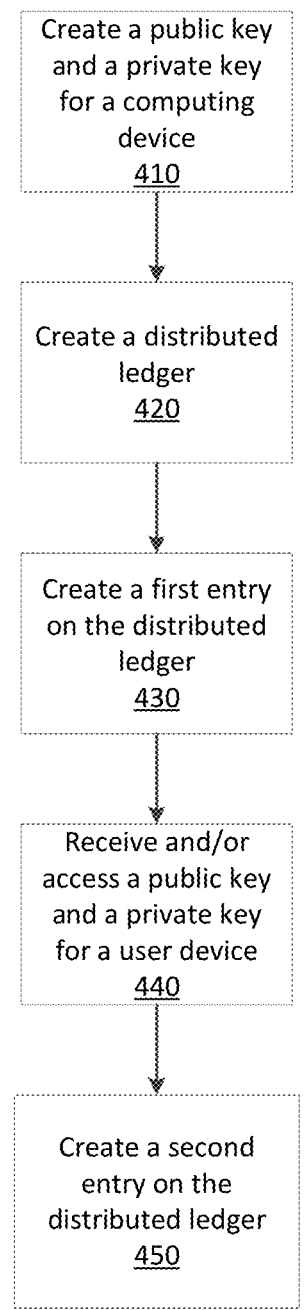
FIG. 4 is a flow diagram of an example method for managing device association.

FIG. 4 shows an example method for managing device association. At step 410, a private key and a public key pair may be created for a computing device. The private key and the public key pair may be created for an application on the computing device. The private key and the public key may be paired. For example, the public key and the private key may be mathematically related. The public key may be configured to decrypt data or content encrypted using the private key. The private key may be configured to decrypt data or content encrypted using the public key. The public key and the private key may be unique to the computing device or to the application on the computing device.

The computing device may comprise, for example, a user device, a mobile device, a laptop computer, a desktop computer, or an IoT device. An IoT device may comprise a device embedded with electronics, such as a circuitry part, a sensor, a camera, an audio input or output, or a lighting unit. An IoT device may comprise computing capabilities. An IoT device may comprise network connectivity capabilities. An IoT device may comprise capabilities to collect and exchange data. For example, an IoT device may comprise a personal computer, a mobile phone, a household appliance, a wearable, a gateway device, a health appliance, a premises management system component, a content device, a display, and a vehicle.

The computing device may comprise an administrator of a distributed ledger (e.g., distributed database, decentralized database, blockchain, etc.). The application on the computing device may comprise an administrator of the distributed ledger. The administrator of the distributed ledger may comprise a creator of the distributed ledger. The administrator may update the distributed ledger, such as by adding a block, adding a distributed ledger entry, recording data, or executing a transaction on the distributed ledger. The administrator may manage the distributed ledger, such as by controlling access to the distributed ledger.

The computing device may be associated with an entity, such as a user, a household, or a service provider. The private key and the public key pair may be created by the computing device. The private key and the public key pair may be created by a software program on the computing device, such as an application. The application may be associated with an entity, such as a user, a household, or a service provider. The application may create the private key and public key upon activation. Activation of the application may comprise running the application, opening the application, or downloading the application. Alternatively or additionally, the private key and the public key may be assigned by a manufacturer of the computing device. The private key and the public key may be embedded in the computing device by the manufacturer of the computing device.

At step 420, a distributed ledger (e.g., distributed database, decentralized database, blockchain, etc.) may be created. The computing device or the application on the computing device may create the distributed ledger. The application or the computing device may create the distributed ledger upon activation of the application or the computing device. The distributed ledger may be created on a pre-existing distributed ledger. For example, creating the distributed ledger may comprise creating a branch on a larger distributed ledger, wherein the larger distributed ledger comprises a plurality of branches.

The distributed ledger may comprise a blockchain, similar to the distributed ledger in FIG. 3. The distributed ledger may comprise a register of associated devices. Associated devices may comprise devices associated with a common entity such as a user, a household, or a service provider, for example. A device may use the distributed ledger to determine whether another device is associated with the device. The device may use the distributed ledger to determine whether to respond to a communication from another device, such as based on association of the devices. The device may use the distributed ledger to determine whether to grant another device access to the device or to a proxied device, such as based on association of the devices.

At step 430, a distributed ledger entry may be created on and/or stored on the distributed ledger. The distributed ledger entry may be associated with the computing device. The computing device may create the distributed ledger entry. The application may create the distributed ledger entry. The distributed ledger entry may comprise data associated with the computing device or the application. The distributed ledger entry may comprise data identifying the computing device or the application. The distributed ledger entry may comprise an address of the computing device. The address may comprise the output of a deterministic function applied to the public key of the computing device, such as a hash of the public key of the computing device. The deterministic function may comprise an algorithm which, for a given input, provides the same output. As an illustrative example, for a given key (e.g., public key), various device may implement the deterministic algorithm such that each of the various devices can calculate the same output, which may be used as an identifier or address. The distributed ledger entry may comprise a timestamp. The timestamp may indicate when the distributed ledger entry was created or recorded in a block or on a distributed ledger. The distributed ledger entry may comprise a hash of a previous distributed ledger entry or block of a blockchain. The block may comprise a digital signature. The signature may comprise an encryption of at least a portion of the entry with a key of the computing device or the application on the computing device, such as an encryption with the private key. The signature may comprise an encryption of one or more of the address, the timestamp, and the hash of the previous block.

The distributed ledger entry may be created by the computing device or the application on the computing device.

Creating the distributed ledger entry may comprise sending an indication of the distributed ledger entry. The indication of the distributed ledger entry may be sent to a network, such as a distributed network. The indication of the distributed ledger entry may be sent to one or more nodes, such as computing devices. The nodes may validate the distributed ledger entry or record the distributed ledger entry on the distributed ledger.

Creating the distributed ledger entry may comprise recording the distributed ledger entry. The distributed ledger entry may be recorded in a block of the distributed ledger. The distributed ledger entry may be recorded on the distributed ledger. Creating the distributed ledger entry may comprise creating adding a block to the distributed ledger. The block may comprise a genesis block, such as the first block or the oldest block in a blockchain.

At step 440, a public key and a private key for a user device may be received or accessed. The public key and the private key may be received or accessed by the computing device or the application on the computing device. The user device may comprise, for example, a mobile device, a laptop computer, a desktop computer, or an IoT device. The user device may comprise a software program, such as an application, on another device. The user device may comprise a device associated with the computing device or the application on the computing device. The user device may comprise a device associated with an entity. The user device and the computing device may be associated with a common entity. The user device may comprise a new device, such as a device newly acquired by the entity or newly associated with the entity or the computing device and application. The user device may comprise a device that is not identified in the distributed ledger. The user device may have access to the distributed ledger. For example, the user device may access the distributed ledger over a network. The user device may comprise capabilities to update the distributed ledger.

The public key and the private key may define a key pair. For example, the public key and the private key may be mathematically related. The public key may be configured to decrypt data or content encrypted using the private key. The private key may be configured to decrypt data or content encrypted using the public key. The public key and the private key may be unique to the user device.

A device such as the user device may create the public key and the private key. The public key and the private key may be assigned by a manufacturer of the user device. The public key and the private key may be embedded in the device by the manufacturer of the user device. The user device may send the public key and the private key to the computing device. The user device may send the public key and the private key to the computing device upon activation of the user device. Activation of the user device may comprise, for example, turning the user device on or connecting the user device to a network. The user device may send the public key and the private key to the computing device in response to a request or a signal from the computing device. The computing device may send a request or a signal to the user device in response to receiving a signal from the user device.

A proxy device may create the public key and the private key for the device. The proxy device may comprise, for example, a user device, a mobile device, a laptop computer, a desktop computer, or an IoT device. The proxy device may comprise a software program, such as an application, on another device. The proxy device may comprise a device associated with the computing device or the application on the computing device. The proxy device may comprise a device associated with an entity. The proxy device and the computing device may be associated with a common entity. The proxy device may have access to the distributed ledger. For example, the proxy device may access the distributed ledger over a network. The proxy device may comprise capabilities to update the distributed ledger.

The user device may not comprise capabilities to create the public key and the private key. The proxy device may create the public key and the private key in response to a request from the user device, such as over a network. The proxy device may create the public key and the private key in response to a signal from the user device, such as a beacon from the user device. The proxy device may create the public key and the private key based on detecting the user device, such as upon activation of the user device. The proxy device may send the public key and the private key to the computing device. The proxy device may send the public key and the private key to the computing device in response to a request or a signal from the computing device.

The computing device or the application on the computing device may create the public key and the private key for the user device. The computing device or the application may create the public key and the private key in response to a request from the user device, such as over a network. The computing device or the application may create the public key and the private key in response to a signal from the user device, such as a beacon from the user device. The computing device or the application may create the public key and the private key based on detecting the user device, such as upon activation of the user device. The computing device or the application may create the public key and the private key in response to a user input. The user input may comprise an identification of the user device, a request, or an update of device association data from a user, such as via the application on the computing device.

At step 450, a second distributed ledger entry may be created on and/or stored on the distributed ledger. The second distributed ledger entry may comprise a block of a blockchain. The distributed ledger entry may be associated with the user device. The second distributed ledger entry may be created by the computing device, the application on the computing device, the user device, or the proxy device, for example.

The distributed ledger entry may comprise an address of the user device. The address of the user device may comprise an output of a deterministic function applied to the public key of the user device, such as a hash of the public key of the user device. The deterministic function may comprise an algorithm which, for a given input, provides the same output. As an illustrative example, for a given key (e.g., public key), various device may implement the deterministic algorithm such that each of the various devices can calculate the same output, which may be used as an identifier or address. The distributed ledger entry may comprise a timestamp. The timestamp may indicate when the distributed ledger entry was created or recorded in a block or on a distributed ledger. The distributed ledger entry may comprise a hash of a previous distributed ledger entry or block of a blockchain or a distributed ledger. The hash may comprise a hash of the distributed ledger entry created in step 420. The block may comprise a digital signature. The digital signature may comprise an encryption of at least a portion of the entry with a key of the creator of the distributed ledger entry, such as a private key. The signature may comprise an encryption of one or more of the address, the timestamp, and the hash of the previous block.

The second distributed ledger entry may be created by the computing device, the application on the computing device, the user device, or the proxy device. Creating the second distributed ledger entry may comprise sending an indication of the distributed ledger entry. The indication of second distributed ledger entry may be sent to the distributed ledger. The indication of the second distributed ledger entry may be sent to a network, such as a distributed network. The indication of the second distributed ledger entry may be sent to one or more nodes, such as computing devices. The nodes may validate the second distributed ledger entry or record the second distributed ledger entry on the distributed ledger.

Creating the second distributed ledger entry may comprise recording the second distributed ledger entry. The second distributed ledger entry may be recorded in a block of the distributed ledger. The block may comprise a block subsequent to a block comprising the distributed ledger entry created in step 420. The distributed ledger entry may be recorded on the distributed ledger.

Steps 440, 450, and 460 may be repeated for one more other devices. For example, if a user acquires a new device or another device is identified, a public key and a private key may be created for the new device. A third distributed ledger entry may be created comprising data associated with the new device. The third distributed ledger entry may be added to and/or created in the distributed ledger.

A device may be deleted from the distributed ledger. For example, a user may lose, sell, or replace the device. The user may indicate that the device is no longer associated with the user, the distributed ledger, or devices associated with the distributed ledger or the user. For example, the user may indicate the change in status of the device via the application on the computing device. A distributed ledger entry may be created indicating that the device is no longer associated with the entity, the distributed ledger, or the associated devices. The distributed ledger entry may be created by the computing device, the application on the computing device, or another device associated with the entity, the distributed ledger or the associated devices. The distributed ledger entry may be added to and/or created in the distributed ledger. The distributed ledger entry may be added to and/or created in the distributed ledger by the computing device, the application on the computing device, or another device associated with the entity, the distributed ledger or the associated devices. Adding the distributed ledger entry may be similar to the processes in Step 430 and Step 460.

Figure 5:
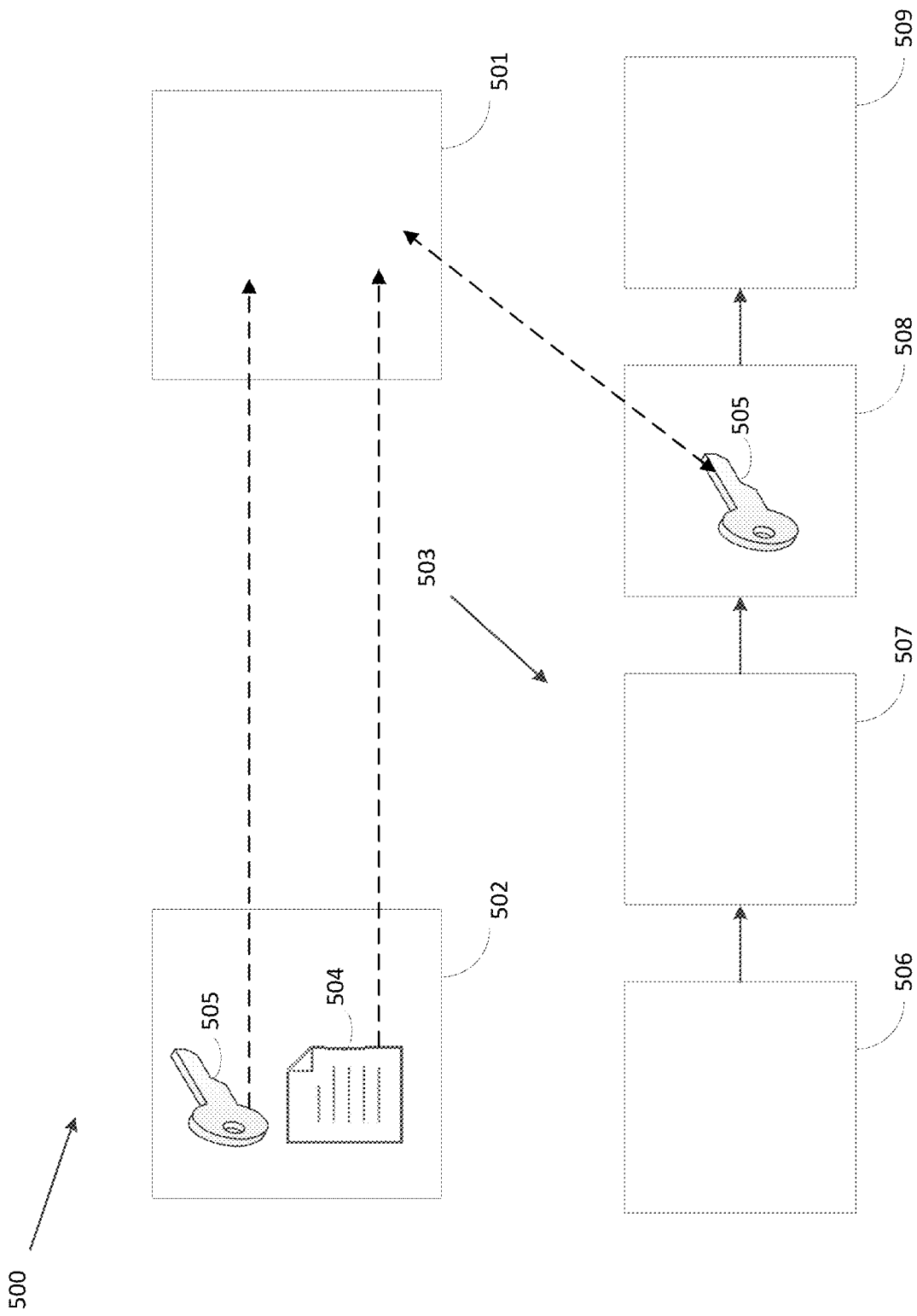
FIG. 5 shows an example system for managing device association.

FIG. 5 shows an example system 500 for managing device association. A distributed ledger 503 (e.g., distributed database, decentralized database, etc.) may comprise a blockchain. The distributed ledger 503 may comprise a register of associated devices. The associated device may comprise devices associated with a common entity, such as a user, a household, or a service provider, for example. The distributed ledger 503 may be associated with an entity. The distributed ledger 503 may be unique to the entity. The distributed ledger 503 may be anonymous. For example, the distributed ledger 503 may not comprise data identifying the associated entity. The distributed ledger 503 may not comprise unsecured data identifying the associated entity. The distributed ledger 503 may comprise data identifying the associated entity in a secure or encrypted form. The data identifying the associated entity in the secure form may be opaque to users or devices examining the distributed ledger 503.

The distributed ledger 503 may comprise a system for establishing peer-to-peer trust among associated devices. A device may use the distributed ledger 503 to determine that another device is associated with the device. The distributed ledger 503 may be used for trusted peer-to-peer communication between devices. The distributed ledger 503 may be used for trusted peer-to-peer access between devices. The associated devices may each have a distributed ledger address. The distributed ledger addresses may comprise outputs of a deterministic function applied to a public key of one the associated devices. The address may comprise outputs of the same deterministic function. The deterministic function may comprise an algorithm which, for a given input, provides the same output. The distributed ledger 503 may comprise one or more entries comprising the distributed ledger addresses of the associated devices. A device, when communicating with another associated device, may send the address of the device to the other device.

As an illustrative example, a recipient device 501 may establish trust with a sender device 502 using the distributed ledger. The recipient device 501 and the sender device 502 may each comprise at least one of a user device, a mobile device, a laptop computer, a desktop computer, and an IoT device. An IoT device may comprise a device embedded with electronics, such as a circuitry part, a sensor, a camera, an audio input or output, or a lighting unit. An IoT device may comprise computing capabilities. An IoT device may comprise network connectivity capabilities. An IoT device may comprise capabilities to collect and exchange data. For example, an IoT device may comprise at least one of a personal computer, a mobile phone, a household appliance, a wearable, a gateway device, a health appliance, a premises management system component, a content device, a display, and a vehicle.

The recipient device 501 and the sender device may each comprise an application or software for accessing the distributed ledger 503. The software may comprise custom software. The software may comprise a custom software library. The software may comprise software configured to enable a device to create a distributed ledger entry. The software may comprise software configured to enable a device to submit the distributed ledger entry to the distributed ledger or to a network of nodes associated with the distributed ledger. The software may be configured to enable a device to compute the distributed ledger address of another device based on a public key of the other device. The software may be configured to enable a device to validate an entry, such as a block. For example, using the software, the device may validate that the entry is signed by another associated device.

The recipient device 501 may receive the communication over a network. The communication may comprise a signal. The communication may comprise data. The communication may comprise a request. For example, the communication may comprise a request to access the recipient device 501. The communication may comprise a request to access a user device and the recipient device 501 may comprise a proxy for the user device. A request to access a device may comprise a request to connect to the device, control the device, or use a function of the device. As an illustrative example, the recipient device 501 may comprise a thermostat and the sender device 502 may comprise a mobile device. The mobile device may send a communication to the thermostat requesting a change of a temperature setting of the thermostat. As another illustrative example, the sender device 502 may comprise a smart phone and the recipient device 501 may comprise a laptop computer. The smart phone may send a communication to the laptop computer requesting use of a camera installed on the laptop computer.

The communication may comprise an identifier of the sender device 502, such as a public key of the sender device 502. The recipient device 501 may use the distributed ledger 503 and the public key 505 to determine whether the sender device 502 comprises a device associated with the recipient device 501. The recipient device 501 may access the distributed ledger 503. The recipient device 501 may be configured to access the distributed ledger 503 over a network. The recipient device 501 may be configured to access the distributed ledger 503 using a proxy device. The recipient device 501 may access the distributed ledger 503 using software of the recipient device 501 or a custom software library for accessing the distributed ledger 503. The recipient device 501 may search the distributed ledger 503 for the public key 505 of the sender device 502. Searching the distributed ledger may comprise scanning the distributed ledger or querying the distributed ledger.

The recipient device 501 may determine the address of the sender device 502. The recipient device 501 may apply the deterministic function to the public key 505. The recipient device 501 may search the distributed ledger 503 for a distributed ledger entry 508 comprising the address of the sender device 502. Based on a distributed ledger entry comprising the address, the recipient device 501 may determine that the sender device 502 comprises a device associated with the recipient device 501. The distributed ledger entry 508 may indicate that the sender device 502 is associated with a common entity.

The recipient device 501 may respond to the recipient device 501. The recipient device 501 may respond to the recipient device 501 based on the determining that the sender device 502 comprises a device associated with the recipient device 501. Responding to the device 501 may comprise sending a communication, such as to the sender device 502 or to another device. Responding to the device 501 may comprise running a device program or modifying a device setting, for example. If the recipient device 501 determines that the sender device 502 does not comprise an associated device, the recipient device 501 may not respond to the communication. The sender device 502 may deny a request of the recipient device 501.

The recipient device 501 may grant the requesting device 502 access to the recipient device 501. The recipient device 501 may grant the requesting device 502 access to the recipient device 501 based on the determining that the requesting device 502 comprises a device associated with the recipient device 501. The recipient device 501 may grant the requesting device 502 access to another device, such as a proxied device.

Figure 6:
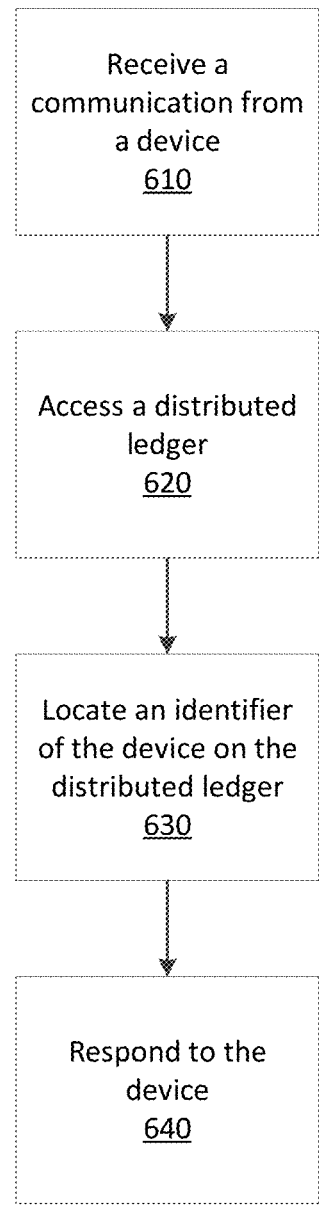
FIG. 6 is a flow diagram of an example method for managing device association.

FIG. 6 shows an example flow diagram of a method for managing device association. At step 610, a communication may be received from a device. The communication may be received by a first device from a second device.

The first device and the second device may each comprise at least one of a user device, a mobile device, a laptop computer, a desktop computer, and an IoT device. An IoT device may comprise a device embedded with electronics, such as a circuitry part, a sensor, a camera, an audio input or output, or a lighting unit. An IoT device may comprise computing capabilities. An IoT device may comprise network connectivity capabilities. An IoT device may comprise capabilities to collect and exchange data. For example, an IoT device may comprise at least one of a personal computer, a mobile phone, a household appliance, a wearable, a gateway device, a health appliance, a premises management system component, a content device, a display, and a vehicle. The first device and the second device may each comprise an application or software for accessing a distributed ledger. The software may comprise custom software. The software may comprise a custom software library.

The communication may be received over a network, such as a local area network, a wide area network, a communication network, a data network, a content network, or a secure network. The communication may comprise a signal. The communication may comprise data. The communication may comprise a request. For example, the communication may comprise a request to access the first device. The communication may comprise a request to access a user device. The first device may comprise a proxy for the user device. A request to access a device may comprise a request to connect to the device, control the device, or use a function of the device.

The communication may comprise a public key of the second device. An address of the second device may be determined using the public key. The address may comprise the output of a deterministic function applied to the public key. The deterministic function may comprise an algorithm which, for a given input, provides the same output. The address may be determined by applying the deterministic function to the public key.

The communication may comprise a digital certificate of the second device. The digital certificate may comprise an X.509 certificate. The digital certificate may comprise a secure socket layer (SSL), transport layer security (TLS), or hyper text transfer protocol secure (HTTPS) certificate, for example. The digital certificate may be installed, stored, or embedded on the second device.

The digital certificate may be created by a certification authority. The second device may send the public key and the private key to the certification authority. The second device may send the public key and the private key to the certification authority based on the second device being initialized, turned on, and/or based on execution of a program on the second device, as examples. The certification authority may create the digital certificate for the second device in response to receiving the keys. The certification authority may send or install the digital certificate on the second device.

Transmission of the digital certificate may trigger a secure protocol, such as SSL or TSL protocol. The secure protocol may encrypt communications between parties. For example, the secure protocol may encrypt communications between the first device and the second device.

The digital certificate may comprise the public key of the second device. The digital certificate may comprise one or more unique identifiers of the second device (e.g., a string of characters, a hash, a name, or an identification number). The digital certificate may comprise a subject of the public key, such as a serial number or a name (e.g., an X.500 Distinguished Name).

The first device may validate the digital certificate of the second device. Validating the digital certificate may comprise proving that the digital certificate belongs to the second device. Validating the digital certificate may comprise proving that the public key is associated with the second device. Validating the digital signature may comprise inspecting an expiration date or time of the digital certificate. The digital certificate may comprise a start time or date and an expiration time or date. The first device may validate the digital certificate by inspecting the expiration time or date and confirming that the time or date is current or has not lapsed.

Validating the digital certificate may comprise validating a digital signature of the digital certificate. The digital certificate may comprise a digital signature of an issuer of the digital certificate, such as a certificate authority, that has verified or guaranteed the contents of the electronic document, such as the public key. The certification authority may guarantee that the public key corresponds to the second device. The certification authority may guarantee the validity of the contents of the digital certificate by signing the digital certificate. The certification authority may sign the digital certificate by encrypting at least a portion of the contents of the digital certificate with a private key of the certification authority. Validating the digital certificate may comprise using a public key of the certification authority to decrypt the portion of the contents of the digital certificate that were encrypted using the private key of the certification authority.

At step 620, a distributed ledger (e.g., distributed database, decentralized database, blockchain, etc.) may be accessed. The first device may access a distributed ledger. The distributed ledger may be like the distributed ledger 300 in FIG. 3. The distributed ledger may comprise a blockchain. The distributed ledger may comprise a register of associated devices. The distributed ledger may comprise a register of associated devices. The associated device may comprise devices associated with a common entity, such as a user, a household, or a service provider, for example. The distributed ledger may comprise data identifying the first device.

The distributed ledger may be associated with an entity. The distributed ledger may be unique to the entity. The distributed ledger may be anonymous. For example, the distributed ledger may not comprise data identifying the associated entity. The distributed ledger may not comprise unsecured data identifying the associated entity. The distributed ledger may comprise data identifying the associated entity in a secure or encrypted form. The data identifying the associated entity in the secure form may be opaque to users or devices examining the distributed ledger.

The distributed ledger may be accessed over a network. The distributed ledger may be accessed using software, an application, or a custom software library for accessing the distributed ledger. The first device may access the distributed ledger via a proxy device.

At step 630, address of the second device may be located on the distributed ledger. Alternatively or additionally, the public key of the second device may be located on the distributed ledger. The first device may locate the address of the second device on the distributed ledger. The first device may locate the address by searching, scanning, or querying the distributed ledger, using the address, for example. The first device may locate the address by comparing the address to other addresses indicated in one or more distributed ledger entries. The address may be located in a distributed ledger entry. The distributed ledger entry may comprise a block, such as a block of a blockchain or a transaction. It may be determined that the second device comprises a device associated with the first device. Based on the distributed ledger entry comprising the address, it may be determined that the second device and the first device are associated with a common entity. It may be determined that the second device comprises a device authorized to access the first device or another device.

The distributed ledger entry may be validated. Validating the distributed ledger entry may comprise confirming that the distributed ledger entry was created by a trusted device. The trusted device may comprise a device associated with the distributed ledger, a device that manages the distributed ledger, or a device that has rights to edit the distributed ledger, for example. Confirming that the distributed ledger entry was created by the trusted device may comprise validating a digital signature of the trusted device in the distributed ledger. For example, the trusted device may have digitally signed at least a portion of the distributed ledger with a public key of the trusted device. A public key of the trusted device may be used to decrypt the portion of the distributed ledger and prove that the entry was created by a device having the private key corresponding to the public key of the trusted device.

At step 640, a response may be issued to the second device. The first device may respond to the second device. The response may comprise a response to the communication from the second device in step 610. The response may be based on the locating the identifier of the second device on the distributed ledger. The response may be based on the confirming that the second device comprises an associated device or an authorized device.

Responding to the second device may comprise sending a communication to the second device. Responding may comprise running a device program or modifying a device setting, at the first device, for example. Responding may comprise granting the second device access to the first device or to a proxied device. If it is determined that the second device does not comprise an associated device or an authorized device, a response may not be issued. Responding may comprise denying access to the first device or to a proxied device. Responding may comprise declining a request. Responding may comprise blocking the second device, such as blocking communications from the second device to the first device.

Figure 7:
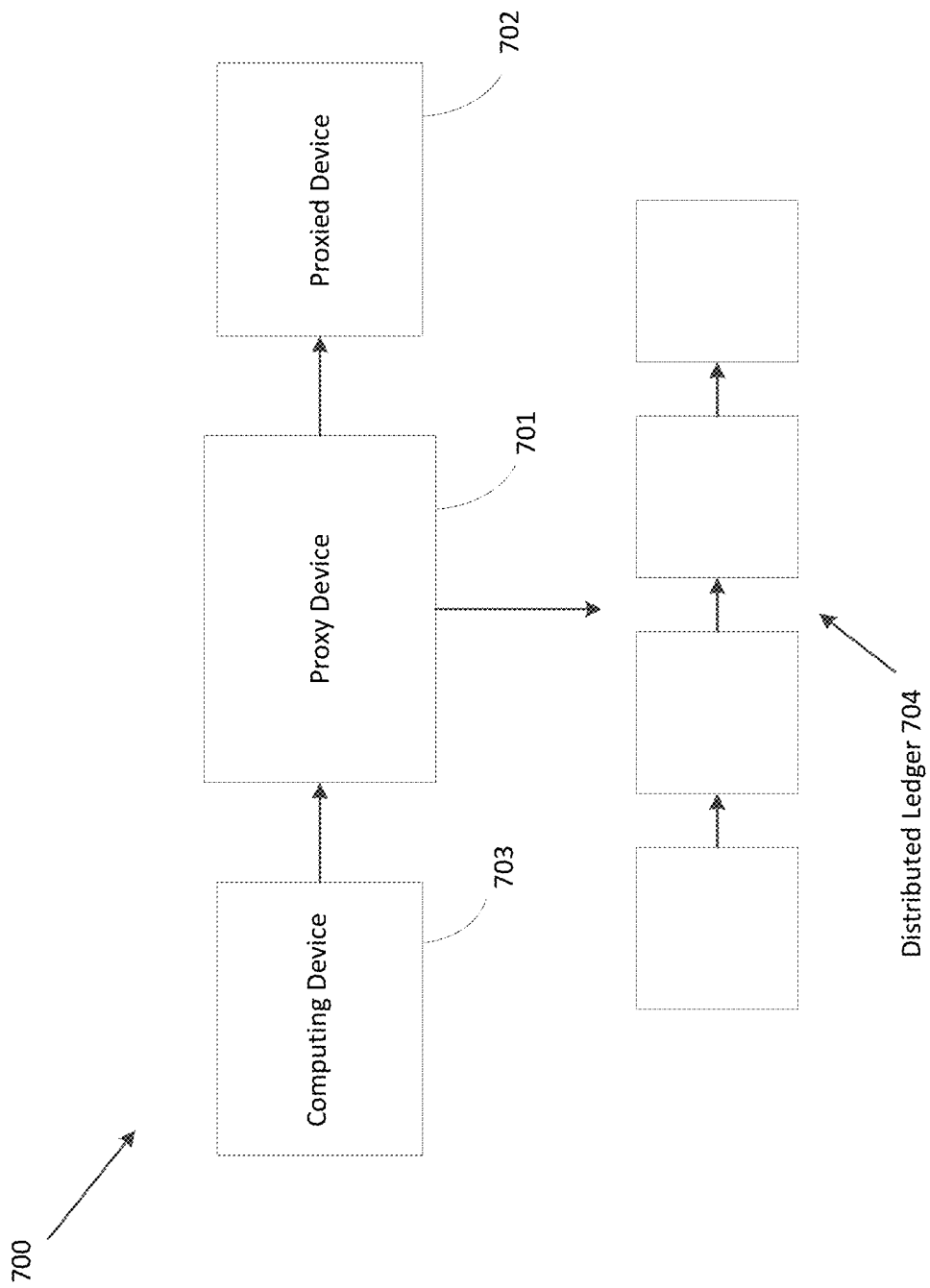
FIG. 7 shows an example system for managing device association.

FIG. 7 shows an example system 700 for managing device association. A computing device 703 may attempt to connect to a proxied device 702 through a proxy device 701. The computing device 703, the proxied device 702, and the proxy device 701 may each comprise at least one of a server, user device, a mobile device, a laptop computer, a desktop computer, and an IoT device. An IoT device may comprise a device embedded with electronics, such as a circuitry part, a sensor, a camera, an audio input or output, or a lighting unit. An IoT device may comprise computing capabilities. An IoT device may comprise network connectivity capabilities. An IoT device may comprise capabilities to collect and exchange data. For example, an IoT device may comprise at least one of a personal computer, a mobile phone, a household appliance, a wearable, a gateway device, a health appliance, a premises management system component, a content device, a display, and a vehicle.

Any of the devices 701, 702, 703 may comprise an application or software for accessing a distributed ledger (e.g., distributed database, decentralized database, blockchain, etc.). The software may comprise custom software. The software may comprise a custom software library. The software may comprise software configured to enable a device to create a distributed ledger entry. The software may comprise software configured to enable a device to submit the distributed ledger entry to the distributed ledger or to a network of nodes associated with the distributed ledger. The software may be configured to enable a device to compute a distributed ledger address of another device. The software may be configured to enable a device to compute a distributed ledger address of another device based on a public key of the other device. The software may be configured to enable a device to authenticate an entry, such as a block, of the distributed ledger. The software may be configured to enable a device to validate an entry, such as a block. For example, using the software, the device may validate that the entry is signed by another associated device.

The proxied device 702 may comprise limited computing or communication capabilities. The proxy device 701 may be configured to perform operations on behalf of the proxied device 702. The proxy device 701 may comprise a relay server or a rendezvous server. The proxy device 701 may comprise a gateway device of a network of associated devices. The proxy device 701 may comprise an administrator of a network of associated devices. The proxy device 701 may manage the association of the devices. The proxy device 701 may manage access to the associated devices. The proxy device 701 may manage a distributed ledger 704 (e.g., distributed database, decentralized database, blockchain, etc.).

Attempting to connect to the proxied device 702 may comprise sending a request to the proxy device 701. The proxy device 701 may authorize the computing device 703 to access the proxied device 702. The proxy device 701 may authorize the computing device 703 to access the proxied device 702 based on whether the computing device 703 comprises an associated device. For example, the proxy device 701 may determine whether the computing device is associated with the proxy device 701 or the proxied device 702. The proxy device 701 may determine whether the computing device 703 is associated with an entity, such as a user, a household, or a service provider. The proxy device 701 may determine whether the computing device 703 is associated with the distributed ledger 704. The proxy device 701 may use the distributed ledger 704 to determine whether the computing device 703 comprises an associated device.

The distributed ledger 704 may be like the distributed ledger 300 in FIG. 3. The distributed ledger 704 may comprise a blockchain. The distributed ledger 704 may comprise a register of associated devices. The associated device may comprise devices associated with a common entity, such as a user, a household, or a service provider, for example.

The distributed ledger 704 may be associated with an entity. The distributed ledger 704 may be unique to the entity. The distributed ledger 704 may be anonymous. For example, the distributed ledger 704 may not comprise data identifying the associated entity. The distributed ledger 704 may not comprise unsecured data identifying the associated entity. The distributed ledger 704 may comprise data identifying the associated entity in a secure or encrypted form. The data identifying the associated entity in the secure form may be opaque to users or devices examining the distributed ledger 704.

The distributed ledger 704 may be accessed over a network, such as a local area network, a wide area network, a data network, a content network, a communications network, or a secured network. The distributed ledger 704 may be accessed using software, an application, or a custom software library for accessing the distributed ledger 704.

The proxy device 701 may receive a request from the computing device 703 to access the proxied device 702. The request may comprise a public key of the computing device 703. The request may comprise a digital certificate of the computing device 703. The digital certificate may comprise an X.509 certificate. The digital certificate may comprise a secure socket layer (SSL), transport layer security (TLS), or hyper text transfer protocol secure (HTTPS) certificate, for example. The digital certificate may be installed, stored, or embedded on the computing device 703.

The digital certificate may be created by a certification authority. The computing device 703 may send its public key and private key to the certification authority. The computing device 703 may send its public key and private key to the certification authority based on the computing device 703 being initialized, turned on, and/or based on a program being executed on the computing device 703. The certification authority may create the digital certificate for the computing device 703 in response to receiving the keys. The certification authority may send or install the digital certificate on the computing device 703.

Transmission of the digital certificate may trigger a secure protocol, such as SSL or TSL protocol. The secure protocol may encrypt communications between parties. For example, the secure protocol may encrypt communications between the computing device 703 and proxy device 701.

The digital certificate may comprise the public key of the computing device 703. The digital certificate may comprise a subject of the public key, such as a serial number or a name (e.g., an X.500 Distinguished Name).

The proxy device 701 may validate the digital certificate of the computing device 703. Validating the digital certificate may comprise proving that the digital certificate belongs to the computing device 703. Validating the digital certificate may comprise proving that the public key belongs to the computing device 703. Validating the digital signature may comprise inspecting an expiration date or time of the digital certificate. The digital certificate may comprise a start time or date and an expiration time or date. The proxy device 701 may validate the digital certificate by inspecting the expiration time or date and confirming that the time or date is current or has not lapsed.

Validating the digital certificate may comprise validating a digital signature of the digital certificate. The digital certificate may comprise a digital signature of an issuer of the digital certificate, such as a certificate authority, that has verified or guaranteed the contents of the electronic document, such as the public key. The certification authority may guarantee that the public key corresponds to the computing device 703. The certification authority may guarantee the validity of the contents of the digital certificate by signing the digital certificate. The certification authority may sign the digital certificate by encrypting at least a portion of the contents of the digital certificate with a private key of the certification authority. Validating the digital certificate may comprise using the public key of the certification authority to decrypt the portion of the contents of the digital certificate that were encrypted using the private key of the certification authority. The digital signature may be validated, such as by using the public key of the certification authority to decrypt the portion of the contents of the digital certificate that were encrypted using the private key of the certification authority.

The public key of the computing device 703 may be obtained from the digital certificate. The proxy device 701 may calculate an address of the computing device 703 using the public key. The address of the computing device 703 may be calculated by applying a deterministic function to the public key. The deterministic function may comprise an algorithm which, for a given input, provides the same output. For example, the deterministic function may output a unique value for any input in its domain. The deterministic function may comprise a hash function, such as MD4, MD5, SHA-1, SHA-256, SHA-512 or SHA-3.

The proxy device 701 may search the distributed ledger 704 for the address of the computing device 703. The proxy device 701 may search the distributed ledger 704 for an address that matches the address calculated for the computing device 703. The distributed ledger 704 may comprise access attributes. The access attributes may be associated with access of the proxied device 702. The access attributes may be associated with access granted to the computing device 703. The access attributes may comprise limitations or conditions on access.

The proxy device 701 may deny the computing device 703 access to the proxied device 702. The proxy device 701 may deny the computing device 703 access to the proxied device 702 based on the distributed ledger 704. The proxy device 701 may determine not to authorize the computing device 703. The proxy device 701 may grant the computing device 703 access to the proxied device 702. The proxy device 701 may grant the computing device 703 access to the proxied device 702 based on the distributed ledger 704. The proxy device 701 may authorize the computing device 703 to access the proxied device 702. Accessing the proxied device 702 may comprise controlling, changing a setting, or using a function of the proxied device 702.

Figure 8:
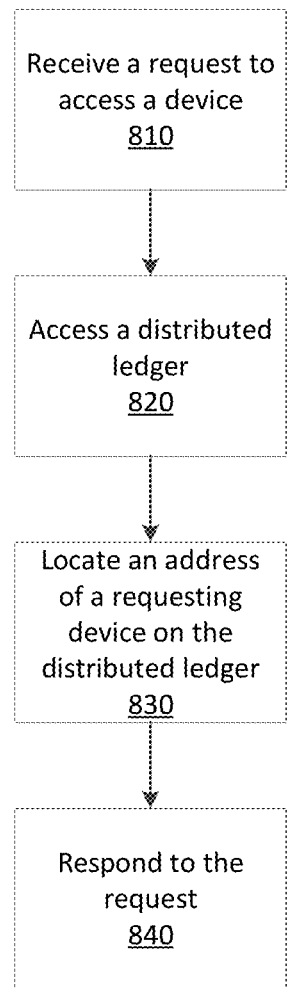
FIG. 8 is a flow diagram of an example method for managing device association.

FIG. 8 shows an example method for managing device association. At step 810, a request to access a device may be received. The request may be received by a proxy device. The request may comprise a request to access a device proxied by the proxy device. The proxy device may be like the proxy device 701 in FIG. 7. The proxied device may be like the proxied device 702 in FIG. 7. The proxy device may receive the request from a computing device. The proxy may receive the request from an application on a computing device.

The computing device, the proxied device, and the proxy device may each comprise at least one of a server, user device, a mobile device, a laptop computer, a desktop computer, and an IoT device. An IoT device may comprise a device embedded with electronics, such as a circuitry part, a sensor, a camera, an audio input or output, or a lighting unit. An IoT device may comprise computing capabilities. An IoT device may comprise network connectivity capabilities. An IoT device may comprise capabilities to collect and exchange data. For example, an IoT device may comprise at least one of a personal computer, a mobile phone, a household appliance, a wearable, a gateway device, a health appliance, a premises management system component, a content device, a display, and a vehicle.

Any of the devices may comprise an application or software for accessing a distributed ledger (e.g., distributed database, decentralized database, blockchain, etc.). The software may comprise custom software. The software may comprise a custom software library. The software may comprise custom software. The software may comprise a custom software library. The software may comprise software configured to enable a device to create a distributed ledger entry. The software may comprise software configured to enable a device to submit the distributed ledger entry to the distributed ledger or to a network of nodes associated with the distributed ledger. The software may be configured to enable a device to compute a distributed ledger address of another device. The software may be configured to enable a device to compute a distributed ledger address of another device based on a public key of the other device. The software may be configured to enable a device to authenticate an entry, such as a block, of the distributed ledger. The software may be configured to enable a device to validate an entry, such as a block. For example, using the software, the device may validate that the entry is signed by another associated device.

The proxied device may comprise limited computing or communication capabilities. The proxy device may be configured to perform operations on behalf of the proxied device. The proxy device may comprise a relay server or a rendezvous server. The proxy device may comprise a gateway device of a network of associated devices. The proxy device may comprise an administrator of a network of associated devices. The proxy device may manage the association of the devices. The proxy device may manage access to the associated devices. The proxy device may manage a distributed ledger.

The proxy device and the proxied device may be connected. The proxy device and the proxied device may be connected over a network, such as a local area network, a wide area network, a data network, a content network, a communications network, or a secured network. The proxy device and the computing device may be connected, such as over the network.

The request may a public key of the computing device. An address of the computing device may be determined. An address of the computing device may be determined based on the public key of the computing device. For example, the address may be determined by applying a deterministic function to the public key. The deterministic function may comprise an algorithm which, for a given input, provides the same output. As an illustrative example, for a given key (e.g., public key), various device may implement the deterministic algorithm such that each of the various devices can calculate the same output, which may be used as an identifier or address.

At step 820, a distributed ledger (e.g., distributed database, decentralized database, blockchain, etc.) may be accessed. The distributed ledger may be accessed by the proxy device. The distributed ledger may be like the distributed ledger 300 in FIG. 3. The distributed ledger may comprise a blockchain. The distributed ledger may comprise a register of associated devices. The associated device may comprise devices associated with a common entity, such as a user, a household, or a service provider, for example.

The distributed ledger may be associated with an entity. The distributed ledger may be unique to the entity. The distributed ledger may be anonymous. For example, the distributed ledger may not comprise data identifying the associated entity. The distributed ledger may not comprise unsecured data identifying the associated entity. The distributed ledger may comprise data identifying the associated entity in a secure or encrypted form. The data identifying the associated entity in the secure form may be opaque to users or devices examining the distributed ledger.

The distributed ledger may be accessed over a network, such as a local area network, a wide area network, a data network, a content network, a communications network, or a secured network. The distributed ledger may be accessed using software, an application, or a custom software library for accessing the distributed ledger.

At step 830, the address of the computing device may be located on the distributed ledger. The address may be located by searching the distributed ledger for the address of the computing device. Searching the distributed ledger may comprise comparing the address to addresses indicated in one or more entries of the distributed ledger. The distributed ledger entry comprising the address of the computing device may be located. The distributed ledger entry may comprise access attributes. The access attributes may be associated with access to the proxied device. The access attributes may be associated with access granted to the computing device.

At step 840, a response to the request may be issued. The proxy device may respond to the request. A response may be issued to the computing device. Responding to the request may be based on validating the request. Responding to the request may be based on the distributed ledger or the distributed ledger entry.

Responding may comprise sending a communication to the computing device. Responding may comprise denying the computing device access to the proxy device. Responding may comprise granting the computing device access to the proxied device. Responding may comprise authorizing the computing device, such as to access the proxied device. The computing device may access the proxied device by connecting to the proxied device. The computing device may connect to the proxied device directly, wirelessly, or via the proxy device. The proxy device may relay communications between the computing device and the proxied device.

Figure 9:
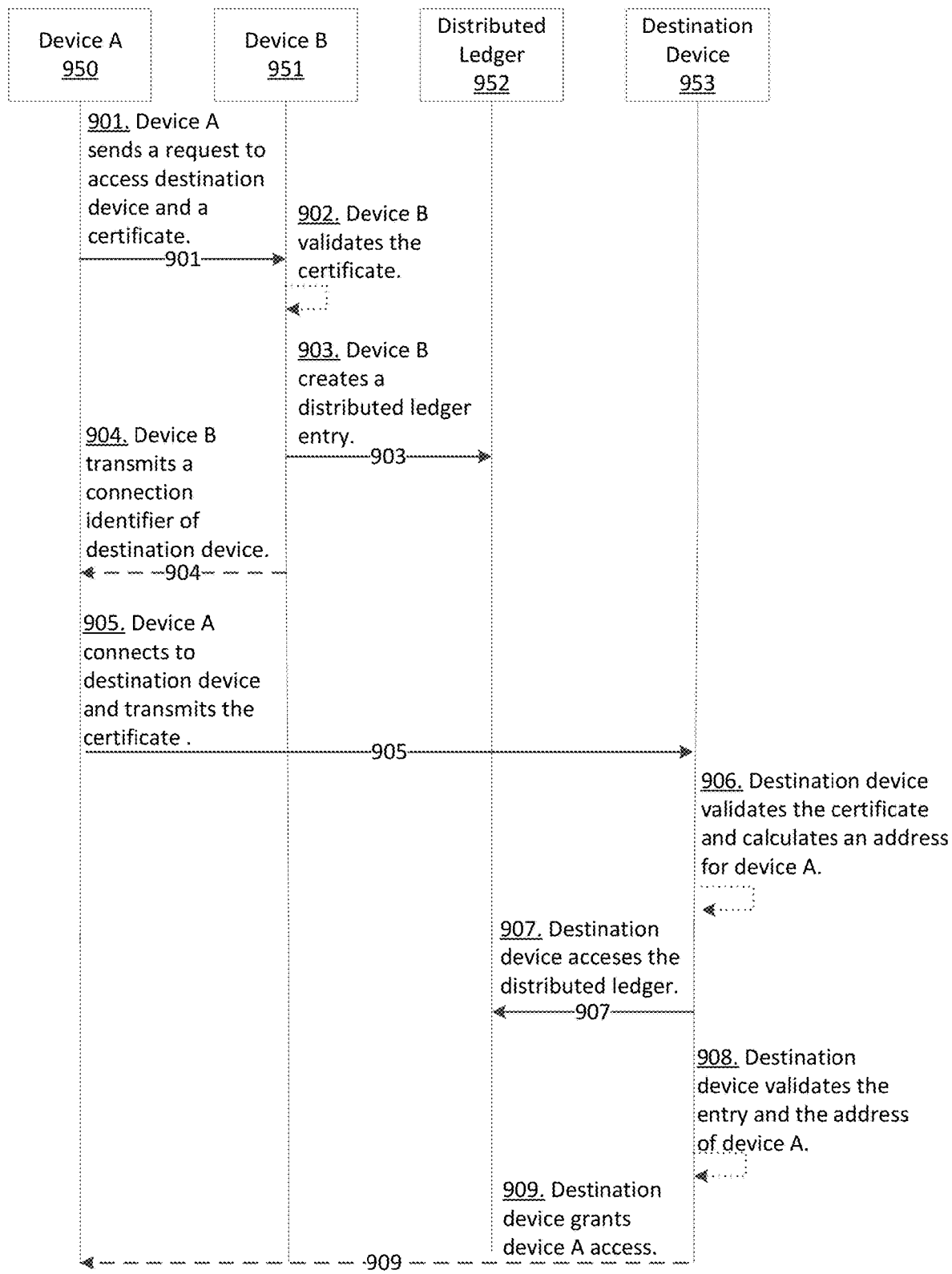
FIG. 9 is a diagram of an example method and system for managing device association.

FIG. 9 shows an example system and method for managing device association. A distributed ledger 952 (e.g., distributed database, decentralized database, blockchain, etc.) may comprise or be part of a system for a device to grant trusted access to another device. The distributed ledger 952 may be like the distributed ledger 300 in FIG. 3. The distributed ledger 952 may comprise a blockchain database and/or utilize blockchain data management techniques. The distributed ledger 952 may comprise a register of associated devices. The distributed ledger 952 may comprise a register of associated devices. The associated devices may comprise devices associated with a common entity, such as a user, a household, or a service provider, for example.

At step 901, a device A 950 may send a request to access a destination device 953. The destination device 953 may not be a trusted device of the device A 950. For example, the destination device 953 may not be associated with the device A 950. Alternatively or additionally, the destination device 953 may be associated with the device A 950.

The device A 950 may send the request to a device B 951. The device B 951 may comprise or act as a proxy for the destination device 953. The device B 951 may have capabilities that the destination device 953 does not, such as computing capabilities, communication capabilities, or capabilities to update the distributed ledger 952.

The device B 951 may comprise a trusted device of the device A 950. For example, the device A 950 may determine that the device B 951 comprises a device associated with the device A 950. The device A 950 may send the request to access the destination device 953 to the device B 951 to establish trust with the destination device 953.

The device B 951 may act as a gatekeeper for a system of associated devices. The device B 951 may manage access to associated devices or devices associated with the distributed ledger 952. The device B 951 may comprise an administrator of the system, a network of associated devices, or the distributed ledger 952. For example, the device B 951 may manage the distributed ledger 952 or may update the distributed ledger 952 based on new associated devices being identified.

Any of the device A 950, the device B 951, and the destination device 953 may be or have associated devices. Any of the device A 950, the device B 951, and the destination device 953 may comprise a device associated with a distributed ledger 952. Any of the device A 950, the device B 951, and the destination device 953 may be associated with an entity or a common entity, such as a user, a household, or a service provider.

Any of the device A 950, the device B 951, and the destination device 953 may comprise at least one of a user device, a mobile device, a laptop computer, a desktop computer, and an IoT device. An IoT device may comprise a device embedded with electronics, such as a circuitry part, a sensor, a camera, an audio input or output, or a lighting unit. An IoT device may comprise computing capabilities. An IoT device may comprise network connectivity capabilities. An IoT device may comprise capabilities to collect and exchange data. For example, an IoT device may comprise at least one of a personal computer, a mobile phone, a household appliance, a wearable, a gateway device, a health appliance, a premises management system component, a content device, a display, and a vehicle. Any of the device A 950, the device B 951, and the destination device 953 may comprise an application or software for accessing a distributed ledger.

The software may comprise custom software. The software may comprise a custom software library. The software may comprise software configured to enable a device to create a distributed ledger entry. The software may comprise software configured to enable a device to submit the distributed ledger entry to the distributed ledger or to a network of nodes associated with the distributed ledger. The software may be configured to enable a device to compute a distributed ledger address of another device based on a public key of the other device. The software may be configured to enable a device to authenticate an entry, such as a block, of the distributed ledger. The software may be configured to enable a device to validate an entry, such as a block. For example, using the software, the device may validate that the entry is signed by another associated device.

The device A 950 may send the request over a network. For example, the network may comprise a local area network, a wide area network, a content delivery or access network, and may be a secure or public network. The device A 950 may send the request as a signal. The request may comprise an address of the device A 950. The request may comprise a digital certificate of the device A 950. The digital certificate may comprise an X.509 certificate. The digital certificate may comprise a secure socket layer (SSL), transport layer security (TLS), or hyper text transfer protocol secure (HTTPS) certificate, for example. The digital certificate may be created by a certification authority. The device A 950 may send the public key and the private key to the certification authority. The device A 950 may send the public key and the private key to the certification authority based on the device A 950 being initialized, turned on, and/or based on execution of a program on the device A 950. The certification authority may create the digital certificate for the device A 950, such as based on the keys. The certification authority may send or install the digital certificate on the device A 950.

Transmission of the digital certificate may trigger a secure protocol, such as SSL or TSL protocol. The secure protocol may encrypt communications between parties. For example, the secure protocol may encrypt communications between the computing device 703 and proxy device 701.

The digital certificate may comprise an electronic document. The digital certificate may comprise one or more unique identifiers of the device A 950 (e.g., a string of characters, a hash, a name, or an identification number). The digital certificate may comprise a subject of the public key, such as a serial number or a name (e.g., an X.500 Distinguished Name).

At step 902, the device B 951 may validate the digital certificate. Validating the digital certificate may comprise proving that the digital certificate belongs to the device A 950. Validating the digital certificate may comprise proving that the one or more unique identifiers belong to the device A 950. Validating the digital signature may comprise inspecting an expiration date or time of the digital certificate. The digital certificate may comprise a start time or date and an expiration time or date. The device B 951 may validate the digital certificate by inspecting the expiration time or date and confirming that the time or date is current or has not lapsed.

Validating the digital certificate may comprise validating a digital signature of the digital certificate. The digital certificate may comprise a digital signature of an issuer of the digital certificate, such as a certificate authority, that has verified or guaranteed the contents of the electronic document, such as the public key. The certification authority may sign the digital certificate by encrypting at least a portion of the contents of the digital certificate with a private key of the certification authority. A public key of the certification authority may be publicly known. The digital certificate may comprise the public key of the certification authority. Validating the digital certificate may comprise using the public key of the certification authority to decrypt the portion of the contents of the digital certificate that were encrypted using the private key of the certification authority.

The device B 951 may determine whether the device A 950 comprises an associated device. For example, the device B 951 may determine whether the device A 950 comprises an associated device by determining an address of the device A 950 using the public key of the device A 950. The public key of the device A 950 may be obtained from the digital certificate. The address of the device A 950 may be calculated by applying a deterministic function to the public key. The deterministic function may comprise an algorithm which, for a given input, produces a same output. The deterministic function may comprise a hash function, such as MD4, MD5, SHA-1, SHA-256, SHA-512 or SHA-3.

The device B 951 may determine whether the device A 950 comprises an associated device by searching the distributed ledger 952 for the calculated address of the device A 950. The device B 951 may access the distributed ledger 952. The device B 951 may search or scan the distributed ledger 952 for a distributed ledger entry comprising the address of the device A 950. The device B 951 may locate a distributed ledger entry comprising the calculated address of the device A 950. For example, the calculated address of the device A 950 may be compared to one or more distributed ledger entries to locate a corresponding address or string in the one or more entries. The device B 951 may determine, based on locating the calculated address of the device A 950, that the device A 950 comprises a device associated with the device B 951.

The device B 951 may decrypt the request. The device B 951 may decrypt the request with a key. For example, if the request is signed using the public key of the device B 951, the device B 951 may decrypt the request with the private key of the device B 951. The device B 951 may inspect the request.

At step 903, the device B 951 may create a distributed ledger entry. The distributed ledger entry may comprise the address of the destination device 953. The distributed ledger entry may comprise the address of the device A 950. The distributed ledger entry may comprise an indication that the address of the device A 950 comprises an allowed address. An allowed address may comprise an address of a device that has been approved or granted permission to access the destination device 953.

The distributed ledger entry may comprise a digital signature of the device B 951. The digital signature may comprise an encryption of at least a portion of the distributed ledger entry with a key of the device B 951, such as the private key of the device B 951. The distributed ledger entry may be digitally signed with the private key of the device B 951 to validate that the distributed ledger entry was created by the device B 951.

The distributed ledger entry may comprise a timestamp. The timestamp may comprise an indication of a time that the distributed ledger entry was created in and/or added to the distributed ledger 952. The distributed ledger entry may comprise an access attribute. The access attribute may comprise a condition or limitation for access of the destination device 953. For example, the access attribute may comprise a time period for which the device A 950 may access the destination device 953. The distributed ledger entry may comprise a script. The script may resemble the following example script:

{seq=2,
ProxieddeviceAddress=lgertst56Y . . . ,
AllowedAddress=2rGtysgh7 . . . , # this is Alice address
notBefore=1477853503,
exp=3600,
Signature=eGhtyklld12Hbma
timestamp=1477853500
}

In the example script, ProxieddeviceAddress may comprise the address of the destination device 953. AllowedAddress may comprise the address of the device A 950. notBefore and exp may comprise access attributes. Signature may comprise the digital signature of the device B 951.

The distributed ledger entry may comprise an identification of a prior distributed ledger entry of the distributed ledger 952. The prior distributed ledger entry may comprise the most recent or the last distributed ledger entry added to and/or created in the distributed ledger 952. For example, the indication of the prior distributed ledger entry may comprise a hash of the prior distributed ledger entry. The hash may be appended to the distributed ledger entry created in step 903. The identification of the prior distributed ledger entry may comprise a mechanism to chain the prior distributed ledger entry to the distributed ledger entry created in step 903.

The device B 951 may add the distributed ledger entry to the distributed ledger 952. Adding the distributed ledger entry may comprise sending the distributed ledger entry. The distributed ledger entry may be sent to a network, such as a distributed network. The distributed ledger entry may be sent to one or more nodes, such as computing devices. The nodes may validate the distributed ledger entry or record the distributed ledger entry on the distributed ledger.

Adding the distributed ledger entry may comprise recording the distributed ledger entry. The distributed ledger entry may be recorded in a block of the distributed ledger 952. The distributed ledger entry may be recorded on the distributed ledger 952. Adding the distributed ledger entry may comprise creating adding a block to the distributed ledger 952. The block may comprise a genesis block, such as the first block or the oldest block in a blockchain. The block may comprise data identifying an entity associated with at least one of the device A 950, the device B 951, or the destination device 953, such as an address or an identifier.

At step 904, the device B 951 may send a key of the destination device 953 to the device A 950. The key may comprise a public key of the destination device 953. The public key of the destination device 953 may be associated with a private key of the destination device 953. The public key of the destination device 953 may be encrypted. The public key of the destination device 953 may be encrypted with the public key of the device A 950. The public key may be encrypted for secure transport of the public key. The public key may be encrypted for secure access to the public key. For example, the key may be encrypted with the public key of the device A such that only the device A 950 may decrypt the key. Only the device A 950 may have access to the paired private key necessary to decrypt the key.

The device B 951 may send a connection identifier of the destination device 953 to the device A 950. The connection identifier may facilitate access to the destination device 953. The connection identifier may comprise a locator of the destination device 953 on a network. The connection identifier may comprise a uniform resource locator (URL), a uniform resource identifier (URI), or a uniform resource name (URN) of the destination device 953. The connection identifier may comprise a locator of the destination device 953 on a local network. The connection identifier may comprise an indication of a mechanism to access the destination device 953. The connection identifier may comprise an indication of a protocol. The connection identifier of the destination device 953 may be encrypted. The connection identifier may be encrypted with the public key of the device A 950. The encryption may be for secure transport and secure access of the connection identifier. For example, the connection identifier may be encrypted with the public key of the device A such that only the device A 950 may decrypt the connection identifier. Only the device A 950 may have access to the paired private key necessary to decrypt the connection identifier.

The device B 951 may send the key and the connection identifier of the destination device 953 to the device A 950 over a network. The network may comprise a local area network, a wide area network, a communication network, a data network, a content provider network, or a secure network, for example. The device B 951 may send the key and the connection identifier of the destination device 953 to the device A 950 directly. For example, the device B 951 may send the key and the connection identifier directly if the device B 951 and the device A 950 may be connected physically, such as by a wired connection.

At step 905, the device A 950 may attempt to connect to the destination device 953. The device A 950 may attempt to connect to the destination device 953 using the connection identifier of the destination device 953 send by the device B 951 in Step 904. The device A 950 may send the digital certificate of the device A 950 to the destination device 953. The digital certificate may comprise the same digital certificate sent to the device B 951 in step 901.

At step 906, the destination device 953 may validate the digital certificate in order to authenticate the contents of the digital certificate. The destination device 953 may validate the digital certificate by validating the digital signature of the issuer of the digital certificate. The destination device 953 may validate the digital signature similar using a method similar to the method used by the device B 951 to validate the digital signature in step 902. The proxied device may calculate the address of the device A 950. The proxied device may calculate the address of the device A 950 using a method similar to the method used by the device B 951 to calculate the address of the device A 950 in step 902.

At step 907, the destination device 953 may access the distributed ledger 952. The device A 950 may access the distributed ledger 952 over the network. The device A 950 may access the distributed ledger 952 using software, such as custom software, an application, or a custom software library.

At step 908, the destination device 953 may validate the distributed ledger entry created by the device B 951 in step 903. The destination device 953 may decrypt one or more one or more entries of the distributed ledger 952, such as using the public key of the device B 951. Successful decryption of the one or more entries with the public key of the device B 951 may indicate that the one or more entries were created by the device B 951. Successful decryption may indicate that the one or more entries were signed with a private key of the device B 951.

The destination device 953 may search for the distributed ledger entry using the address of the device A 950 calculated. The destination device 953 may search for the distributed ledger entry using the address of the device A 950 calculated based on the public key of the device A 950 received form the device B 951. The destination device 953 may determine that device A 950 comprises a device associated with the destination device 953. The destination device 953 may determine that device A 950 comprises a device associated with the destination device 953 based on the locating the calculated address of the device A 950 in the distributed ledger 952.

At step 909, the destination device 953 may grant the device A 950 access to the destination device 953. Access may comprise control, connection, or use, for example. Use may comprise use of a function of the destination device 953. The destination device 953 may grant the device A 950 access according to the access attributes in the distributed ledger entry. For example, the destination device 953 may allow the device A 950 to access the destination device 953 for the period of time specified in the access attributes.

Figure 10:
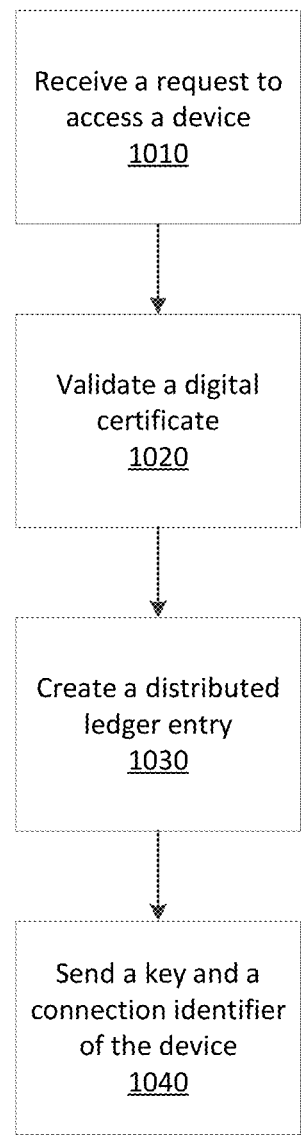
FIG. 10 is a flow diagram of an example method for managing device association.

FIG. 10 shows an example method for managing device association. At step 1010, a request may be received to access a device. The request may be received at a first device. The request may comprise a request for a third device to access a second device. The request may be received from the third device.

Any of the first device, the second device, and the third device may comprise at least one of a user device, a mobile device, a laptop computer, a desktop computer, and an IoT device. An IoT device may comprise a device embedded with electronics, such as a circuitry part, a sensor, a camera, an audio input or output, or a lighting unit. An IoT device may comprise computing capabilities. An IoT device may comprise network connectivity capabilities. An IoT device may comprise capabilities to collect and exchange data. For example, an IoT device may comprise at least one of a personal computer, a mobile phone, a household appliance, a wearable, a gateway device, a health appliance, a premises management system component, a content device, a display, and a vehicle. Any of the first device, the second device, and the third device may comprise an application or software for accessing a distributed ledger (e.g., distributed database, decentralized database, blockchain, etc.). The software may comprise custom software. The software may comprise a custom software library.

Any of the first device, the second device, or the third device may comprise associated devices. Associated devices may comprise devices associated with an entity or a common entity, such as a user, a household, or a service provider. Associated devices may comprise devices associated with a distributed ledger (e.g., distributed database, decentralized database, blockchain, etc.). The distributed ledger may comprise a register of associated devices. The first device may comprise a proxy for the second device. The first device may comprise a gatekeeper of a system of associated devices. The gatekeeper may manage a distributed ledger associated with the system of associated devices. The gatekeeper may manage access to associated devices.

The request may comprise a digital certificate. The digital certificate may be associated with the third device. The digital certificate may comprise an X.509 certificate. The digital certificate may comprise a secure socket layer (SSL), transport layer security (TLS), or hyper text transfer protocol secure (HTTPS) certificate, for example. The digital certificate may be installed, stored, or embedded on the third device. The digital certificate may be created by a certification authority. The third device may send its public key and private key to the certification authority. The third device may send its public key and private key to the certification authority based on the third device being initialized or turned on or based on execution of a program on the third device. The certification authority may create the digital certificate for the third device in response to receiving the keys. The certification authority may send or install the digital certificate on the third device.

Transmission of the digital certificate may trigger a secure protocol, such as SSL or TSL protocol. The secure protocol may encrypt communications between parties. For example, the secure protocol may encrypt communications between the third device and a recipient device.

The digital certificate may comprise an electronic document. The digital certificate may comprise one or more unique identifiers of the third device (e.g., a string of characters, a hash, a name, or an identification number). The digital certificate may comprise a subject of the public key, such as a serial number or a name of the third device (e.g., an X.500 Distinguished Name). The request may comprise an identification of at least one of the first device, the second device, or the third device.

At step 1020, the digital certificate may be validated. Validating the digital certificate may comprise proving that the digital certificate belongs to the third device. Validating the digital certificate may comprise proving that the one or more unique identifiers belong to the third device. Validating the digital signature may comprise inspecting an expiration date or time of the digital certificate. The digital certificate may comprise a start time or date and an expiration time or date. The first may validate the digital certificate by inspecting the expiration time or date and confirming that the time or date is current or has not lapsed.

Validating the digital certificate may comprise validating a digital signature of the digital certificate. The digital certificate may comprise a digital signature of an issuer of the digital certificate, such as the certificate authority. The digital signature may indicate that the certification authority guarantees that the public key corresponds to the third device. The certification authority may sign the digital certificate by encrypting at least a portion of the contents of the digital certificate with a private key of the certification authority. The public key of the certification authority may be publicly available. Validating the digital certificate may comprise using the public key of the certification authority to decrypt the portion of the contents of the digital certificate that were encrypted using the private key of the certification authority. The digital signature may be validated, such as by using the public key of the certification authority to decrypt the portion of the contents of the digital certificate that were encrypted using the private key of the certification authority. Validating the request may comprise determining whether the third device comprises a device associated with the first device or the second device. Determining whether the third device comprises an associated device may comprise locating a distributed ledger entry comprising an identifier of the third device. The distributed ledger may be searched or scanned for a distributed ledger entry comprising the identifier of the third device. The identifier may be received with the request in step 1010. The identifier may be received from the second device or the third device. The identifier may be obtained from the digital certificate.

The request may be decrypted. The request may be decrypted by the first device. The request may be decrypted with a key. For example, if the request is signed with the public key of the first device or the second device, the request may be decrypted using the private key of the first device or the second device.

At step 1030, a distributed ledger entry may be created. The first device may create the distributed ledger entry. The distributed ledger entry may be created for a distributed ledger (e.g., distributed database, decentralized database, blockchain, etc.). The distributed ledger may comprise the distributed ledger in step 1020. The distributed ledger may be like the distributed ledger 300 in FIG. 3. The distributed ledger may comprise a blockchain. The distributed ledger may comprise a register of associated devices. The distributed ledger may comprise a register of associated devices. The associated device may comprise devices associated with a common entity, such as a user, a household, or a service provider, for example. The distributed ledger may comprise data identifying one or more devices, such as the first device, the second device, and the third device. The distributed ledger may be accessed using software, such as software, an application, or a custom software library.

The distributed ledger entry may comprise an address of the second device. The address of the second device may comprise the output of a deterministic function applied to the public key of the second device. The distributed ledger entry may comprise an address of the third device. The address of the third device may comprise the output of a deterministic function applied to the public key of the third device. The distributed ledger entry may comprise an indication that the address of the third device comprises an allowed address.

The distributed ledger entry may comprise a digital signature of the first device. The digital signature may comprise an encryption of at least a portion of the distributed ledger entry, such as the private key of the first device. The distributed ledger entry may be digitally signed with the private key of the first device to validate that the distributed ledger entry was created by the first device.

The distributed ledger entry may comprise a timestamp. The timestamp may comprise an indication of a time that the distributed ledger entry was created or added to and/or created in the distributed ledger. The distributed ledger entry may comprise an access attribute. The access attribute may comprise a condition or limitation for access of the second device. For example, the access attribute may comprise a time period for which the third device may access the second device. The distributed ledger entry may comprise a script. The script may resemble the following example script:

```
{ seq = 2,
    SeconddeviceAddress = 1gertst56Y.....,
        AllowedAddress = 2rGtysgh7....., # this is Alice address
        notBefore = 1477853503,
        exp = 3600,
        Signature = eGhtyklld12Hbma .....,
        timestamp = 1477853500
}
```

In the example script, SeconddeviceAddress may comprise the address of the second device. AllowedAddress may comprise the address of the third device. notBefore and exp may comprise access attributes. Signature may comprise the digital signature of the first device.

The distributed ledger entry may comprise an identification of a prior distributed ledger entry of the distributed ledger. The prior distributed ledger entry may comprise the most recent or the last distributed ledger entry added to and/or created in the distributed ledger. For example, the indication of the prior distributed ledger entry may comprise a hash of the prior distributed ledger entry. The hash may be appended to the distributed ledger entry. The identification of the prior distributed ledger entry may comprise a mechanism to chain the prior distributed ledger entry to the distributed ledger entry.

The distributed ledger entry may be added to and/or created in the distributed ledger, such as by the first device. Creating the distributed ledger entry may comprise sending an indication of the distributed ledger entry. The indication of the distributed ledger entry may be sent to a network, such as a distributed network. The indication of the distributed ledger entry may be sent to one or more nodes, such as computing devices. The nodes may validate the distributed ledger entry or record the distributed ledger entry on the distributed ledger.

Creating the distributed ledger entry may comprise recording the distributed ledger entry. The distributed ledger entry may be recorded in a block of the distributed ledger. The distributed ledger entry may be recorded on the distributed ledger. Adding the distributed ledger entry may comprise creating adding a block to the distributed ledger. The block may comprise data identifying an entity associated with at least one of the first device, the second device, and the third device, such as an address or an identifier.

At step 1040, a key of the second device may be sent. The first device may send the key of the second device. The key of the second device may be sent to the third device. The key may comprise a public key of the second device. The public key of the second device may be encrypted. The public key of the second device may be encrypted with the public key of the third device. The public key may be encrypted for secure transport of the public key. The public key may be encrypted for secure access to the public key. For example, the key may be encrypted with the public key of third device such that only the third device may decrypt the key. Only the third device may have access to the paired private key necessary to decrypt the key.

A connection identifier of the second device may be sent. The first device may send a connection identifier of the second device to the third device. The connection identifier may facilitate access to the second device. The connection identifier may be sent over a network. The connection identifier may comprise a location of the second device on a network, such as a communication network. The connection identifier may comprise a uniform resource locator (URL), a uniform resource identifier (URI), or a uniform resource name (URN) of the second device. The connection identifier may comprise an indication of a mechanism to access the second device. The connection identifier may comprise an indication of a protocol. The connection identifier of the second device may be encrypted. The connection identifier may be encrypted with the public key of the device A 950. The encryption may be for secure transport and secure access of the connection identifier. For example, the connection identifier may be encrypted with the public key of the third device such that only the third device may decrypt the connection identifier. Only the third device may have access to the paired private key necessary to decrypt the connection identifier.

Figure 11:
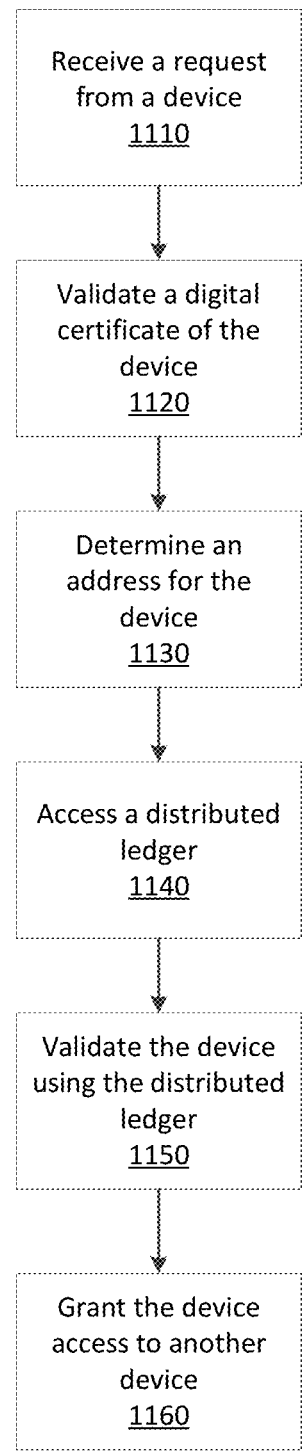
FIG. 11 is a flow diagram of an example method for managing device association.

FIG. 11 shows an example method for managing device association. At step 1110, a request to access a first device may be received. The request may be received by the first device. The request may be sent from a second device. The request may comprise a digital certificate of the second device. The digital certificate may comprise an X.509 certificate. The digital certificate may comprise a secure socket layer (SSL), transport layer security (TLS), or hyper text transfer protocol secure (HTTPS) certificate, for example. The digital certificate may be installed or embedded on the second device. The digital certificate may be created by a certification authority. The second device may send a public key and a private key of the second device to the certification authority based on the second device being initialized or turned on, such as based on execution of a program on the second device. The certification authority may create the digital certificate for the second device. The certification authority may create the digital certificate for the second device based on the keys. The certification authority may send or install the digital certificate on the second device.

Transmission of the digital certificate may trigger a secure protocol, such as SSL or TSL protocol. The secure protocol may encrypt communications between parties. For example, the secure protocol may encrypt communications between the second device and the first device.

The digital certificate may comprise the public key of the second device. The digital certificate may comprise one or more unique identifiers of the second device (e.g., a string of characters, a hash, a name, or an identification number). The digital certificate may comprise a subject of the public key, such as a serial number or a name of the second device (e.g., an X.500 Distinguished Name).

At step 1120, the digital certificate may be validated. The digital certificate may be validated by the first device. Validating the digital certificate may comprise proving that the digital certificate belongs to the second device. Validating the digital certificate may comprise proving that the one or more unique identifiers belong to the second device. Validating the digital signature may comprise inspecting an expiration date or time of the digital certificate. The digital certificate may comprise a start time or date and an expiration time or date. The first device may validate the digital certificate by inspecting the expiration time or date and confirming that the time or date is current or has not lapsed.

Validating the digital certificate may comprise validating a digital signature of the digital certificate. The digital certificate may comprise a digital signature of an issuer of the digital certificate. The certification authority may digitally sign the digital certificate as an indication of a guarantee of the validity of the contents of the digital certificate. The certification authority may sign the digital certificate by encrypting at least a portion of the contents of the digital certificate with a private key of the certification authority. The public key of the certification authority may be publicly available. The digital certificate may comprise the public key of the certification authority. Validating the digital certificate may comprise using the public key of the certification authority to decrypt the portion of the contents of the digital certificate that were encrypted using the private key of the certification authority.

At step 1130, an address may be determined for the second device. The address may be determined using the public key. The first device may obtain the public key of the second device from the digital certificate. The first device may receive the public key of the second device, such as from an intermediary device. The address may be determined by applying a deterministic function to the public key. The deterministic function may comprise an algorithm which, for a given input, produces a same output. The deterministic function may comprise a hash function, such as MD4, MD5, SHA-1, SHA-256, SHA-512 or SHA-3. At step 1140, a distributed ledger may be accessed. The first device may access the distributed ledger. The distributed ledger may be like the distributed ledger 300 in FIG. 3. The distributed ledger may comprise a blockchain. The distributed ledger may comprise a register of associated devices. The distributed ledger may comprise a register of associated devices. The associated device may comprise devices associated with a common entity, such as a user, a household, or a service provider, for example. The distributed ledger may comprise data identifying one or more devices, such as the first device and the second device. The distributed ledger may be accessed using software, such as software, an application, or a custom software library.

At step 1150, the second device may be validated. The first device may validate the second device using the distributed ledger. For example, the first device may decrypt one or more entries of the distribute database using a public key of a device associated with the first device. The device associated with the first device may comprise a trusted device. The device may comprise a proxy device, a gateway device, or an intermediary device. The first device may determine that the one or more entries were created by the associated device, such as based on successful decryption of the one or more entries. The first device may determine that the one or more entries were signed with a private key of the associated device, based on successful decryption of the one or more entries with the public key. The associated device may have created the distributed ledger entry in response to a request from the second device to access the first device.

The distributed ledger may be searched for the address determined for the second device in step 1130. A distributed ledger entry comprising the address of the second device may be located. One or more entries decrypted with the public key of the associated device may be searched for address of the second device.

The distributed ledger entry comprising the address of the second device may be indicative of a granting of access to the second device. The distributed ledger entry may comprise an address of one or more of the first device, the second device, and the third device. The distributed ledger entry may comprise an indication that the address of the second device comprises an allowed address. An allowed address may comprise an address of a device that has been approved or granted permission to access the first device.

The distributed ledger entry may comprise a timestamp. The timestamp may comprise an indication of a time that the distributed ledger entry was created or added to and/or created in the distributed ledger. The distributed ledger entry may comprise an access attribute. The access attribute may comprise a condition or limitation for access to the first device. The distributed ledger entry may comprise a script. The script may resemble the following example script:

```
{ seq = 2,
    FirstdeviceAddress = 1gertst56Y.....,
    AllowedAddress = 2rGtysgh7.....,
    notBefore = 1477853503,
    exp = 3600,
    Signature = eGhtyklld12Hbma .....,
    timestamp = 1477853500
}
```

In the example script, FirstdeviceAddress may comprise the address of the first device. AllowedAddress may comprise the address of the second device. notBefore and exp may comprise access attributes. Signature may comprise the digital signature of the creator of the distributed ledger entry.

At step 1160, access may be granted to second device. Access may be granted for the second device to access the first device. The first device may grant the second device access to the first device. Access may comprise control, connection, or use of the first device, for example. Use may comprise use of a function of the first device. Access to the first device may be granted or permitted according to the access attributes in the distributed ledger entry. For example, the first device may manage or limit access based on the access attributes.

The second device may be denied access, such as by the first device. For example, if the address for the second device of the distributed ledger entry and the address calculated for the second device do not match, it may be determined that the second device is not authorized to access the first device. The first device may determine not to grant the second device access to the first device.

The systems and method described in the present disclosure may be used to manage device association and security in one or more connected homes. The connected homes may comprise homes equipped with connected home devices, such as Internet of Things (IoT) devices or homes in areas equipped with connected home devices. The connected home devices may comprise devices with computing capabilities or network connectivity capabilities. The connected home devices may comprise premises management devices, such as premises management devices located at a home or subdivision. The connected home device may comprise automation devices, such as health monitoring devices or devices located at a home of a user requiring daily living assistance.

The connected home devices may be configured to determine and assert their ownership. The connected home devices may be configured to make access decisions without a central authentication and authorization service. Central authentication and authorization services are often the target of concentrated attack. A distributed ledger (e.g., distributed database, decentralized database, blockchain, etc.) associated with the connected homes may comprise a permissioned distributed ledger.

The connected home devices may be configured to attach themselves to the distributed ledger. To attach itself to the distributed ledger, a connect home device user may download an application on the connect home device. The user may perform a log-in process on the application, such as a 2-step login process with out of band message validation. In response, the application may generate a unique digital identity for the user. The application may generate a distributed ledger entry comprising the unique digital identity. The application may send the distributed ledger entry to a miner device. The application may send a digital certificate to the miner device.

The miner device may validate the distributed ledger entry. The miner device may validate the distributed ledger entry by determining that the user is legitimate, such as based on a digital signature of the transaction or digital certificate of the connected home device. The miner device may determine that the digital certificate is not expired. The miner device may determine that the digital certificate is issued by a trusted certificate authority.

The miner device may determine whether a pre-existing entry on the distributed ledger comprises an indication of the user. The miner device may determine whether a pre-existing entry on the distributed ledger comprises an indication of the user based on validating of the distributed ledger entry. The miner device may add the distributed ledger entry to the distributed ledger. The miner device may add the distributed ledger entry to the distributed ledger based on a determination that no pre-existing entry on the distributed ledger comprises an indication of the user. The distributed ledger entry may immutably bind the user to the distributed ledger.

Additional connected home devices may be associated with the user and recorded on the distributed ledger. For example, the application may receive an association request from a new connected home device. The application may generate a new distributed ledger entry comprising an indication of the new connected home device. The application may generate a new distributed ledger entry comprising an indication of the new connected home device. The application may generate a new distributed ledger entry comprising an indication of the new connected home device based on the association request. The new distributed ledger entry may be sent to the miner device. The miner device may add the new distributed ledger entry to the distributed ledger. The new distributed ledger entry added to and/or created in the distributed ledger may comprise a record of the association of the user, the application, and the new connected home device.

The connected home devices may each store a copy of the aggregate distributed ledger. Alternatively or additionally, each connected home device may store a copy of the distributed ledger entries associated with the connected home device, such as the entries comprising an indication of an identifier of the connected home device. The connected home device may periodically access the aggregate distributed ledger to access updated entries associated with the connected home device. The connected home device may download new entries associated with the connected home device. The connected home devices may use the distributed ledger entries to determine whether to grant access to other connected home devices requesting access to the connected home devices, such as based on whether the entries indicate that the devices requesting devices are associated with the connected home devices. The connected home devices may determine whether the entries indicate time limits on the access granted to the requesting devices.

A digital identity may be generated for a connected home user. The user may comprise an individual person or a group of people associated with one or more connected homes. The digital identity may be unique to the user. The digital identity may comprise a key associated with the user, such as a public key and a private key pair. The digital identity may comprise a distributed ledger wallet address, such as a Bitcoin wallet address ("BTC address"). The address may comprise the outcome of a deterministic function applied to the public key. The deterministic function may comprise an algorithm which, for a given input, provides the same output. The deterministic function may comprise a hash function, such as MD4, MD5, SHA-1, SHA-256, SHA-512, or SHA-3.

A distributed ledger entry may be generated comprising an indication that the user and the one or more connected homes are associated. For example, the distributed ledger entry may comprise an indication of the digital identity of the user. The distributed ledger may comprise an indication of an identifier of a user device associated with the user. The identifier of the user device may comprise a public key of the user device, such as the device public key generated in step 410 of FIG. 4. The identifier of the user device may comprise a distributed ledger address associated with the user device. The address may comprise the output of a deterministic function applied to the public key of the user device. The deterministic function may comprise an algorithm which, for a given input, produces a same output. The deterministic function may comprise a hash function, such as MD4, MD5, SHA-1, SHA-256, SHA-512, or SHA-3. The distributed ledger entry may be generated by the user device. The distributed ledger entry may be generated by a proxy device, such as based on an indication, received from the user device, to generate the entry. The distributed ledger entry may be generated by a connected home device.

The distributed ledger entry may be configured for a distributed ledger associated with the one or more connected homes. The distributed ledger may comprise a blockchain. The distributed ledger may be created on a pre-existing distributed ledger. For example, creating the distributed ledger may comprise creating a branch or a fork on a larger distributed ledger, wherein the larger distributed ledger comprises a plurality of branches or forks. The distributed ledger may comprise a register of users associated with the connected homes. The distributed ledger may comprise a register of devices associated with the connected homes. For example, the distributed ledger may comprise a plurality of entries comprising indications of user or the devices associated with the connected homes. The users associated with the connected homes may comprise a community of users, such as users who live within a geographic region, users who are friends or family members, users who are work for a common entity, or users who are customers of a service provider, as examples. As an illustrative example, the community of users may comprise users requiring assistance, such as in daily living activities, and users who provide assistance to the users requiring assistance. The device may comprise a home automation device in the home of an elderly person who needs assistance operating the home automation device. As another illustrative example, the community of users may comprise users who live in a subdivision. The devices associated with the connected homes may comprise devices shared by the subdivision residents, such as a surveillance camera on a street of the subdivision. The distributed ledger may be private, permissioned, or public. For example, the distributed ledger may comprise a permissioned distributed ledger, only accessible by the user or devices associated with the connected homes.

The distributed ledger entry may be added to and/or created in the distributed ledger. The distributed ledger entry may be added by one or more devices associated with the connected homes, for example. The distributed ledger entry may be added by a device that generated the digital identity for the user or a device that receives an indication of the digital identity of the user. The distributed ledger entry may be added by a device configured to manage the distributed ledger, like a device similar to the proxy device 701 in FIG. 7. Adding the distributed ledger entry may comprise sending the distributed ledger entry. The distributed ledger entry may be sent to a network, such as a distributed network. The distributed ledger entry may be sent to one or more nodes, such as the nodes 110 in FIG. 1. The nodes may validate the distributed ledger entry or record the distributed ledger entry on the distributed ledger.

Adding the distributed ledger entry may comprise recording the distributed ledger entry. The distributed ledger entry may be recorded in a block of the distributed ledger. The distributed ledger entry may be recorded on the distributed ledger. Adding the distributed ledger entry may comprise adding a block to the distributed ledger.

The connected home user may wish to grant access to a connected home device to another user associated with the connected homes. As an illustrative example, if the connected home device comprises a premises management device at a home of the user, when the user goes out of town, the user may wish to grant access to the connected home device to someone who is watching over the home. As another illustrative example, if the user requires assistance with daily living, the user may wish to grant access to the connected home device to an assisted living provider.

Alternatively or additionally, a user may request access to a connected home device. As an illustrative example, a resident in a subdivision may request access to a premises management device of the subdivision, such as a streetlight or a surveillance camera. As another illustrative example, an assisted living services provider may request access to a home automation device in the home of a patient, such as a thermostat or a garage door opener. A request for access to the connected home device may be sent, such as to a user device of another user, to a proxy device, or to the connected home device. In response to the request, another user may determine to grant the user access to the connected home device. In response to the request, a device, such as the user device, the proxy device, or the connected home device may determine to grant the user access to the connected home device, such as using the method in step 1150 of FIG. 11.

To grant another user access to the connected home device, a distributed ledger entry may be generated. The distributed ledger entry may be generated by a user device of the user granting access. The distributed ledger entry may be generated by the connected home device. The distributed ledger entry may comprise an indication of the digital identity of the user. The distributed ledger entry may comprise an indication of an identifier of the connected home device. The distributed ledger entry may comprise an indication that the other user is authorized to access the connected home device, such as an indication of a digital identity of the other user or a condition of the access to the connected home device granted to the other user. For example, the condition of the access to the connected home device may comprise an indication of a time in which the other user may access the connected home device. As an illustrative example, the condition of the access may comprise an indication of a period of time for which the user is going out of town. The condition of the access to the connected home device may comprise an indication of a function of the connected home device that the other user may access. For example, if the connected home device is a premises management device, the condition may comprise an indication that the other user may access a camera function of the premises management device, but not an arm or disarm function of the premises management device.

The distributed ledger entry may be added to and/or created in the distributed ledger. Adding the distributed ledger entry to the distributed ledger may comprise sending an indication of the distributed ledger entry to one or more other devices associated with the distributed ledger. The other devices may validate the distributed ledger entry. Validating the distributed ledger entry may comprise determining that the distributed ledger comprises another entry comprising an indication that the user or the other user is associated with the connected homes. Validating the distributed ledger entry may comprise determining that the user is associated with the connected home device or that the user is authorized to grant access to the connected home device, such as by determining that the distributed ledger comprises another entry comprising an indication of the digital identity of the user and an indication of the identifier of the connected home device.

Validating the distributed ledger entry may be based on a geographic location of the user, the other user, the user device of the user, the user device of the other user, or the connected home device. The geographic location may comprise coordinates indicative of a current geographic position of the user, the other user, the user device of the user, the user device of the other user, or the connected home device. The coordinates may comprise a latitude and a longitude. The geographic location of the user, the other user, the user device of the user, the user device of the other user, or the connected home device may comprise a distance relative to another of the user, the other user, the user device of the user, the user device of the other user, or the connected home device. Validating the distributed ledger entry may comprise determining the geographic location of the user, the other user, the user device of the user, the user device of the other user, or the connected home device. Determining the geographic location of the user, the other user, the user device of the user, the user device of the other user, or the connected home device may comprise using a record comprising an indication of the geographic location of the user, the other user, the user device of the user, the user device of the other user, or the connected home device. The record may comprise one or more entries of the distributed ledger. The record may comprise a database of geographic locations of users or devices. Determining the geographic location of the user may comprise using a global positioning system (GPS) or geo-fence technology. Validating the distributed ledger entry may comprise determining that the geographic location is within a discrete geographic boundary. Users or devices located within the discrete geographic boundary may be authorized to access connected home devices. The discrete geographic boundary may comprise a subdivision, a city, a township, a county, an area assigned to a zip code, a state, or a country for example.

The distributed ledger entry may be recorded on the distributed ledger. The distributed ledger entry may be recorded on the distributed ledger based on the validating the distributed ledger entry. The distributed ledger entry may be recorded in a block of the distributed ledger. The distributed ledger entry may be recorded on the distributed ledger. Adding the distributed ledger entry may comprise adding a block to the distributed ledger.

The connected home device may receive an access request from the other user. The connected home device may receive the access request from the user device of the other user. Alternatively or additionally, a proxy device, such as a device similar to the proxy device 701 in FIG. 7, may receive the access request. The access request may comprise the digital identity of the other user. The access request may comprise a digital certificate associated with the other user or the user device of the other user. The digital certificate may be like the digital certificate used in the method described in FIG. 11. The digital certificate may comprise an X.509 certificate. The digital certificate may comprise a secure socket layer (SSL), transport layer security (TLS), or hyper text transfer protocol secure (HTTPS) certificate, for example. The digital certificate may be created by a certification authority.

The connected home device may determine the digital identity of the other user. The proxy device may determine the digital identity. The digital identity may be determined using the digital certificate. The digital certificate may comprise the digital identity of the other user. The digital certificate may comprise the public key of the other user. The device may calculate the digital identity using the public key from the certificate, such as by applying a deterministic function to the public key. The device may validate the digital certificate, such as by using the method in step 1120 of FIG. 11.

The connected home device may use the digital identity of the other user to determine to grant access to the device to the other user. The proxy device may use the digital identity of the other user to determine to grant access to the device to the other user. The connected home device or the proxy device may determine to grant access to the other user. The distributed ledger may be used to determine to grant access to the other user. For example, it may be determined that the distributed ledger comprises the entry comprising an indication that the other user is authorized to access the connected home device.

Based the determination to grant access to the connected home device to the other user, the other user may be granted access to the device. The connected home device or the proxy device may grant access to the user. Access may comprise control, connection, or use of the device, for example. Use may comprise use of a function of the device. Access may comprise control, connection, or use of the device via another device, for example. Access to the first device may be granted or permitted according to the conditions indicated in the distributed ledger entry.

Figure 12:
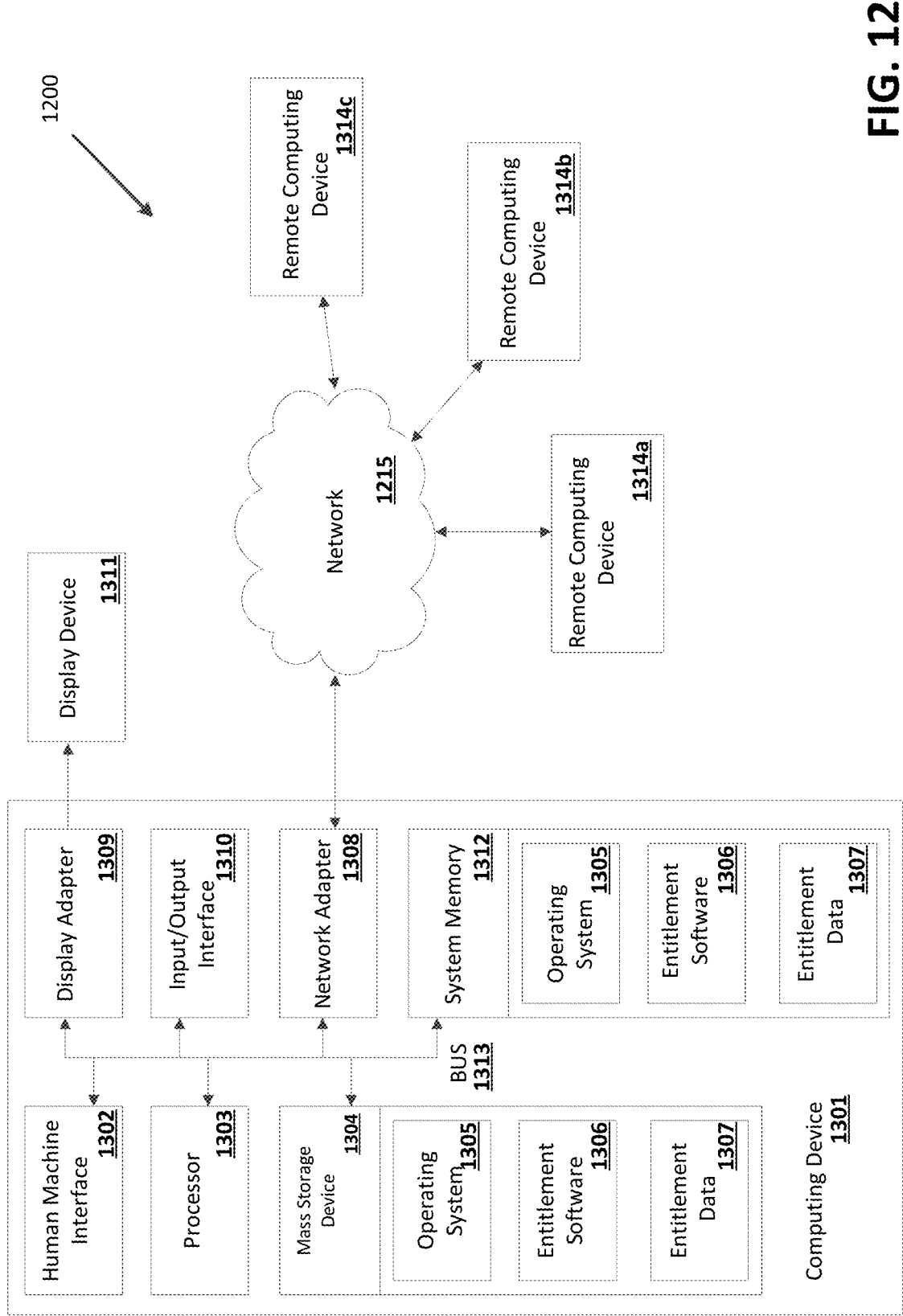
FIG. 12 shows an example computing environment.

FIG. 12 shows a block diagram illustrating an exemplary operating environment 1200 for performing the disclosed methods of managing digital rights. This exemplary operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computing device 1201. The components of the computing device 1201 may comprise, but are not limited to, one or more processors or processing units 1203, a system memory 1212, and a system bus 1213 that couples various system components including the processor 1203 to the system memory 1212. In the case of multiple processing units 1203, the system may utilize parallel computing.

The system bus 1213 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1213, and all buses specified in this description may also be implemented over a wired or wireless network connection and each of the subsystems, including the processor 1203, a mass storage device 1204, an operating system 1205, entitlement software 1206, entitlement data 1207, a network adapter 1208, system memory 1212, an Input/Output Interface 1210, a display adapter 1209, a display device 1211, and a human machine interface 1202, may be contained within one or more remote computing devices 1214*a,b,c* at physically separate locations, connected through buses of this form, in effect implementing a fully distributed system.

The computing device 1201 typically comprises a variety of computer readable media. Exemplary readable media may be any available media that is accessible by the computing device 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM). The system memory 1212 typically contains data such as entitlement data 1207 and/or program modules such as operating system 1205 and entitlement software 1206 that are immediately accessible to and/or are presently operated on by the processing unit 1203.

The computing device 1301 may comprise other removable/non-removable, volatile/non-volatile computer storage media. By way of example, FIG. 12 shows a mass storage device 1204 which may provide non-volatile storage of computer code, computer readable instructions, data structures, program modules, and other data for the computing device 1201. For example, a mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 1204, including by way of example, an operating system 1205 and entitlement software 1206. Each of the operating system 1205 and entitlement software 1206 (or some combination thereof) may comprise elements of the programming and the entitlement software 1206. Entitlement data 1207 may also be stored on the mass storage device 1204. Entitlement data 1207 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 1201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 1203 via a human machine interface 1202 that is coupled to the system bus 1213, but may be connected by other interface and bus structures, such as a parallel port, game port, an IEEE 1294 Port (also known as a Firewire port), a serial port, or a universal serial bus (USB).

A display device 1211 may also be connected to the system bus 1213 via an interface, such as a display adapter 1209. It is contemplated that the computing device 1301 may have more than one display adapter 1209 and the computer 1201 may have more than one display device 1211. For example, a display device may be a monitor, an LCD (Liquid Crystal Display), or a projector. In addition to the display device 1211, other output peripheral devices may comprise components such as speakers (not shown) and a printer (not shown) which may be connected to the computing device 1201 via Input/Output Interface 1310. Any step and/or result of the methods may be output in any form to an output device. Such output may be any form of visual representation, including, but not limited to, textual, graphical, animation, audio, tactile, and the like. The display 1211 and computing device 1201 may be part of one device, or separate devices.

The computing device 1201 may operate in a networked environment using logical connections to one or more remote computing devices 1214a,b,c. By way of example, a remote computing device may be a personal computer, portable computer, a smart phone, a server, a router, a network computer, a peer device or other common network node, and so on. Logical connections between the computing device 1201 and a remote computing device 1214a,b,c may be made via a network 1215, such as a local area network (LAN) and a general wide area network (WAN). Such network connections may be through a network adapter 1208. A network adapter 1208 may be implemented in both wired and wireless environments. Such networking environments are conventional and commonplace in dwellings, offices, enterprise-wide computer networks, intranets, and the Internet.

For purposes of illustration, application programs and other executable program components such as the operating system 1205 are shown herein as discrete blocks, although it is recognized that such programs and components reside at various times in different storage components of the computing device 1201, and are executed by the data processor(s) of the computer. An implementation of entitlement software 1206 may be stored on or sent across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The invention claimed is:

1. A method comprising:
   receiving, by a computing device and from a user device, a request to access a destination device, wherein the computing device has authority to grant access to the destination device, and wherein the request comprises a digital certificate associated with the user device;
   determining to grant the user device access to the destination device;
   determining an address of the user device;
   causing, based on the determining to grant the user device access to the destination device, a distributed ledger entry to be created on a distributed ledger, wherein the distributed ledger entry comprises an indication that the user device is authorized to access the destination device of the user device request, an indication of the address of the user device, and an indication of an address of the destination device on a communication network; and
   sending, to the user device and based on the determining to grant the user device access to the destination device requested by the user device, a locator of the destination device, wherein the locator of the destination device comprises the address of the destination device on the communication network.

2. The method of claim 1, wherein the destination device is associated with a user; and
   wherein the determining to grant the user device access to the destination device is based on a determination that the user device is associated with a service provider of the user.

3. The method of claim 1, wherein the destination device is associated with a community of users; and
   wherein the determining to grant the user device access to the destination device is based on a determination that the user device is associated with a member of the community of users.

4. The method of claim 1, wherein the determining to grant the user device access to the destination device is based on a geographic location of at least one of the computing device, the user device, or the destination device.

5. The method of claim 1, wherein the indication that the user device is authorized to access the destination device comprises a digital signature of the computing device.

6. The method of claim 1, wherein the digital certificate comprises a public key associated with the user device; and
   wherein the determining the address of the user device comprises applying at least a deterministic function to the public key.

7. The method of claim 1, wherein the sending the locator of the destination device on the communication network further comprises sending a public key of the destination device.

8. A method comprising:
   receiving, from a user device and by a computing device, a request to access a network device, wherein the request comprises a public key of the user device;
   determining, by applying at least a deterministic function to the public key, an address of the user device;
   determining to grant the user device access to the network device;

causing, based at least on the determining to grant the user device access to the network device, a distributed ledger entry to be created on a distributed ledger, wherein the distributed ledger entry comprises the address of the user device and an indication that the user device is authorized to access the network device of the user device request, an indication of an address of the network device on a communication network; and granting, based on the distributed ledger entry, the user device access to the network device requested by the user device, wherein the granting the user device access to the network device further comprises sending, to the user device, a locator of the network device, wherein the locator of the network device comprises an address of the network device on the communication network.

9. The method of claim 8, wherein the distributed ledger entry further comprises an indication of a time limit to access to the network device; and wherein the granting the user device access to the network device comprises granting, based on the indication of the time limit, the user device access to the network device.

10. The method of claim 8, wherein the granting the user device access to the network device comprises enabling, by the computing device, the user device to control or use a function of the network device.

11. The method of claim 8, wherein the distributed ledger entry is encrypted with a private key of an intermediary device.

12. The method of claim 8, wherein the indication that the user device is authorized to access the network device comprises a digital signature of the computing device authorized to grant access to the network device.

13. The method of claim 8, wherein accessing the distributed ledger entry comprises comparing the address of the user device to a plurality of distributed ledger entries and determining that at least one of the plurality of distributed ledger entries corresponds to the address of the user device.

14. A system comprising:
an intermediary device authorized to grant access to a destination device, wherein the intermediary device is configured to:
receive, from a user device, a first request to access the destination device, wherein the first request comprises a public key of the user device;
determine, by applying at least a deterministic function to the public key of the user device, an address of the user device;
determine to grant the user device access to the destination device;
cause, based on determining to grant the user device access to the destination device, a distributed ledger entry to be created on a distributed ledger, wherein the distributed ledger entry comprises an indication that the user device is authorized to access the destination device of the user device request, an indication of an address of the destination device on a communication network, and an indication of the address of the user device; and send, to the user device, a public key of the destination device and a locator of the destination device, wherein the locator of the destination device comprises the address of the destination device on the communication network; and the destination device requested by the user device configured to:
receive, from the user device, a second request to access the destination device, wherein the second request comprises the public key of the user device;
determine, by applying at least the deterministic function to the public key of the user device, the address of the user device;
access, using the address of the user device, the distributed ledger entry; and
grant, based on the distributed ledger entry, the user device access to the destination device.

15. The system of claim 14, wherein the intermediary device is associated with the distributed ledger; and
wherein the intermediary device is configured to determine to grant the user device access to the destination device further based on a second distributed ledger entry comprising an indication that the user device is associated with the distributed ledger.

16. The system of claim 14, wherein the intermediary device is configured to create additional distributed ledger entries comprising identifiers of devices associated with the intermediary device.

17. The system of claim 14, wherein the destination device is configured to grant, based on the distributed ledger entry, the user device access to the destination device comprising enabling the user device to control or use a functionality of the destination device.

18. The system of claim 14, wherein the destination device is configured to:
receive an indication of a device associated with the destination device;
generate, responsive to receiving the indication of the associated device, a private key and a public key of the associated device; and
generate a new distributed ledger entry comprising an identifier of the associated device.

19. The system of claim 14, wherein the user device is configured to:
send, to the intermediary device, the first request to access the destination device, the first request comprising the public key of the user device;
receive, from the intermediary device, the public key of the destination device and the locator of the destination device, wherein the locator of the destination device comprises the address of the destination device on the communication network;
connect, using the address of the destination device, to the destination device; and
responsive to the destination device granting the user device access, accessing the destination device.

20. The system of claim 14, wherein the user device is configured to grant the user device access to the destination device based on the distributed ledger entry being signed by the intermediary device.

\* \* \* \* \*